US009817375B2

(12) United States Patent
Li et al.

(10) Patent No.: US 9,817,375 B2
(45) Date of Patent: Nov. 14, 2017

(54) SYSTEMS AND METHODS FOR MODELING ENERGY CONSUMPTION AND CREATING DEMAND RESPONSE STRATEGIES USING LEARNING-BASED APPROACHES

(71) Applicant: Board of Trustees of The University of Alabama, Tuscaloosa, AL (US)

(72) Inventors: Shuhui Li, Northport, AL (US); Ming Sun, Tuscaloosa, AL (US); Dong Zhang, Tuscaloosa, AL (US)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 300 days.

(21) Appl. No.: 14/632,009

(22) Filed: Feb. 26, 2015

(65) Prior Publication Data
US 2015/0248118 A1 Sep. 3, 2015

Related U.S. Application Data

(60) Provisional application No. 61/944,669, filed on Feb. 26, 2014.

(51) Int. Cl.
| | |
|---|---|
| G05B 13/04 | (2006.01) |
| F24F 11/00 | (2006.01) |
| G06N 3/08 | (2006.01) |
| G06N 3/00 | (2006.01) |

(52) U.S. Cl.
CPC ............ *G05B 13/04* (2013.01); *F24F 11/006* (2013.01); *G06N 3/084* (2013.01); *F24F 2011/0075* (2013.01); *G06N 3/006* (2013.01)

(58) Field of Classification Search
USPC .......................... 700/291, 295, 297, 296, 286
See application file for complete search history.

(56) References Cited

U.S. PATENT DOCUMENTS

| | | | | |
|---|---|---|---|---|
| 2005/0107892 A1* | 5/2005 | Matsui | ...................... | H02J 3/14 700/28 |
| 2010/0179704 A1* | 7/2010 | Ozog | ............... | G06Q 10/06315 700/291 |
| 2013/0096728 A1* | 4/2013 | Steffes | ...................... | H02J 3/14 700/291 |

OTHER PUBLICATIONS

Antti Honkela, Multilayer perceptrons, Jun. 30, 2011, Retrieved from the Internet: <URL: http://www.hiit.fi/u/ahonkela/dippa/node41.html>.*

(Continued)

*Primary Examiner* — Christopher E Everett
*Assistant Examiner* — Istiaque Ahmed
(74) *Attorney, Agent, or Firm* — Meunier Carlin & Curfman LLC

(57) ABSTRACT

According to various implementations, a demand response (DR) strategy system is described that can effectively model the HVAC energy consumption of a house using a learning based approach that is based on actual energy usage data collected over a period of days. This modeled energy consumption may be used with day-ahead energy pricing and the weather forecast for the location of the house to develop a DR strategy that is more effective than prior DR strategies. In addition, a computational experiment system is described that generates DR strategies based on various energy consumption models and simulated energy usage data for the house and compares the cost effectiveness and energy usage of the generated DR strategies.

11 Claims, 21 Drawing Sheets

(56) References Cited

OTHER PUBLICATIONS

Gamze Oğcu, Forecasting Electricity Consumption with Neural Networks and Support Vector Regression, In: Procedia—Social and Behavioral Sciences vol. 58, pp. 1576-1585, Oct. 12, 2012, ScienceDirect.*
C. S. Chen, M. S. Kang, J. C. Hwang and C. W. Huang, "Application of binary integer programming for load transfer of distribution systems," PowerCon 2000. 2000 International Conference on Power System Technology. Proceedings (Cat. No. 00EX409), Perth, WA, 2000, pp. 305-310 vol. 1.*
Lui, "Get Smart," IEEE Power & Energy Mag., 2010, vol. 8, No. 3, 66-78.
"Demand Response Discussion for the 2007 Long-Term Reliability Assessment," North American Electric Reliability Corporation, Feb. 2007. Accessed on May 18, 2013 <http://www.naesb.org/pdf2/dsmee052407w4.pdf>.
"Benefits of Demand Response in Electricity Markets and Recommendations for Achieving them," A report to the United States Congress, U.S. Department of Energy, Feb. 2006. Accessed on May 18, 2013 <http://eetd.lbl.gov/ea/EMS/reports/congress-1252d.pdf>.
Albadi, "Demand Response in Electricity Markets: An Overview," Proc. of IEEE Power Engineering Society 2007 General Meeting, Tampa FL, Jun. 24-28, 2007.
Pourmousavi, "Real-Time Central Demand Response for Primary Frequency Regulation in Microgrids," IEEE Trans. on Smart Grid, Dec. 2012, vol. 3, No. 4, pp. 1988-1996.
Fan, "A Distributed Demand Response Algorithm and Its Application to PHEV Charging in Smart Grids," IEEE Trans. on Smart Grid, Sep. 2012, vol. 3, No. 3, pp. 1280-1290.
Navid-Azarbaijani, "Realizing load reduction functions by aperiodic switching of load groups," IEEE Trans. Power Syst., 1996, vol. 11, No. 2, pp. 721-727.
Huang "A model reference adaptive control strategy for interruptible load management," IEEE Trans. Power Syst., 2004, vol. 19, No. 1, pp. 683-689.
Westermann, "Demand matching wind power generation with wide-area measurement and demand-side management,"IEEE Trans. Energy Convers., 2007, vol. 22, No. 1, pp. 145-149.
Nguyen, "Pool-based demand response exchange-concept and modeling," IEEE Trans. Power Syst., 2011, vol. 26, No. 3, pp. 1677-1685.
Faria, "Demand response management in power systems using a particle swarm optimization approach," IEEE Intell. Syst., 2011.
Conejo, "Real-Time Demand Response Model," IEEE Trans. on Smart Grid, Dec. 2010, vol. 1, No. 3, pp. 236-242.
Parvania, "Integrating load reduction into wholesale energy market with application to wind power integration," IEEE Syst. J., 2012, vol. 6, No. 1, pp. 35-45.
Dietrich, "Demand response in an isolated system with high wind integration," IEEE Trans. Power Syst., 2012, vol. 27, No. 1, pp. 20-29.
Carrion, "A stochastic programming approach to electric energy procurement for large consumers," IEEE Trans. Power Syst., 2007, vol. 22, No. 2, pp. 744-754.
Gomez-Villalva, "Optimal energy management of an industrial consumer in liberalized markets," IEEE Trans. Power Syst., 2003, vol. 18, pp. 716-723.
Philpott, "Optimizing demand-side bids in day-ahead electricity markets," IEEE Trans. Power Syst., 2006, vol. 21, pp. 488-498.
Hogan, "Electricity Market Reform: Market Design and Resource Adequacy," Harvard University, Cambridge, Massachusetts, Jun. 2011.
Carrion, "Forward contracting and selling price determination for a retailer," IEEE Trans. Power Syst., 2007, vol. 22, No. 4, pp. 2105-2114.
Holland, "The short-run effects of time-varying prices in competitive electricity markets," Energy J., 2006, vol. 27, No. 4, pp. 127-155.
Black, "Integrating Demand into the U.S. Electric Power System: Technical, Economic, and Regulatory Frameworks for Responsive Load," PhD dissertation, Massachusetts Institute of Technology, Jun. 2005.
Taylor, "GridLAB-D Technical Support Document: Residential End-Use Module Version 1.0," Pacific Northwest National Laboratory, Richland, Washington, Jul. 2008.
Zhou, "Agent-Based Electricity Market Simulation with Demand Response from Commercial Buildings," IEEE Trans. on Smart Grid, Dec. 2011, vol. 2, No. 4, pp. 580-588.
Li, "A Comparison Study of Demand Response using Optimal and Heuristic Algorithms", IEEE Power & Energy Society General Meeting, Vancouver, British Columbia, Canada, Jul. 21-25, 2013.
Kim, "Scheduling Power Consumption With Price Uncertainty," IEEE Trans. on Smart Grid, Sept 2011, vol. 2, No. 3, pp. 519-527.
Farhangi, "The Path of the Smart Grid," IEEE Power & Energy Mag., Jan./Feb. 2010, vol. 8, No. 1.
"Weather Data & Weather Data Processing Utility Programs," Accessed on May 19, 2013 <http://doe2.com/index_wth.html>.
Li, "Heat Transfer Simulation Using PSpice", Proc. of 2003 ASME Summer Heat Transfer Conf., Jul. 21-23, 2003, Las Vegas, Nevada, USA.
Spees, "Demand Response and Electricity Market Efficiency," The Electricity Journal, Apr. 2007, vol. 20, Issue 3, pp. 69-85.
Goldman, National Action Plan for Energy Efficiency (2010). "Coordination of Energy Efficiency and Demand Response," <www.epa.gov/eeactionplan>.
Thomas, "Effects of Price-Responsive Residential Demand on Retail and Wholesale Power Market Operations," Proceedings of 2012 IEEE Power & Energy Society General Meeting, San Diego, CA, Jul. 22-26, 2012.
"eQUEST Introductory Tutorial, version 3.64," James J. Hirsch & Associates, Camarillo, CA, Dec. 2010.
Saele, "Demand Response from Household Customers: Experiences From a Pilot Study in Norway," IEEE Trans. on Smart Grid, Mar. 2011, vol. 2, No. 1, pp. 102-109.
Residential Energy Consumption Survey (RECS), U.S. Energy Information Administration. Accessed on May 26, 2013 <http://www.eia.gov/consumption/residential/index.cfm>.
Estimating Appliance and Home Electronic Energy Use, United States Department of Energy; Office of Energy Efficiency and Renewable Energy. Accessed on May 26, 2013 <http://www.energysavers.gov/your_home/>.
"Conditions of Thermal Comfort: Influence of Humidity and Temperature on Personal Well-Being," Advances in Intelligent Systems and Computing, vol. 201, 2013, pp. 287-298 Sensirion, 2010.
Real-Time Pricing for Residential Customers, Ameren Focused Energy. http://www.ameren.com/sites/aiu/ElectricChoice/Pages/ResRealTimePricing.aspx.
Li, "Comparative Analysis of Regression and Artificial Neural Network Models for Wind Turbine Power Curve Estimation ", Transactions of the ASME, Journal of Solar Energy Engineering, Nov. 2001, vol. 123, No. 4, pp. 327-332.
Kennedy, "Particle swarm optimization", Proc. of IEEE Int. Conf. on Neural Networks, Piscataway, NJ, USA, 1995, pp. 1942-1948.
Padhye, "Boundary Handling Approaches in Particle Swarm Optimization", Advances in Intelligent Systems and Computing 2013, vol. 201, Springer, pp. 287-298.
Adika, et al., "Demand-side bidding strategy for residential energy management in a smart grid environment," IEEE Trans. Smart Grid, vol. 5, No. 4, pp. 1724-1733, Jul. 2014.
ANSI/ASHRAE. "Standard 55-2004, Thermal environmental conditions for human occupancy," Amer. Soc. Heating Refrig. Air-Cond. Eng., Atlanta, GA, USA, 5 pages, 2004.
Caron, et al., "Incentive-based energy consumption scheduling algorithms for the smart grid," in Proc. IEEE Int. Conf. Smart Grid Commun., Gaithersburg, MD, USA, pp. 391-396, 2010.
Centolella, "The integration of price responsive demand into regional transmission organization (RTO) wholesale power markets and system operations," Energy, vol. 35, No. 4, pp. 1568-1574, Apr. 2010.

(56) References Cited

OTHER PUBLICATIONS

Chen, et al., "Real-time price-based demand response management for residential appliances via stochastic optimization and robust optimization," IEEE Trans. Smart Grid, vol. 3, No. 4, pp. 1822-1831, Dec. 2012.

Chen, et al., "Uncertainty-aware household appliance scheduling considering dynamic electricity pricing in smart home," IEEE Trans. Smart Grid, vol. 4, No. 2, pp. 932-941, Jun. 2013.

Chinneck, Practical Optimization: A Gentle Introduction. Accessed on Apr. 11, 2016, 3 pages. [Online]. Available: http://wwww.sce.carleton.ca/faculty/chinneck/po.html.

Chu, et al., "A direct load control of air-conditioning loads with thermal comfort control," in Proc. IEEE PES Gen. Meeting, San Francisco, CA, USA, vol. 1, pp. 664-669, Jun. 2005.

Darby, "Load management at home: Advantages and drawbacks of some 'active demand side' options," J. Power Energy, vol. 227, No. 1, pp. 9-17, 2012.

Daum, et al., "A personalized measure of thermal comfort for building controls," Build. Enviro. vol. 46, No. 1, pp. 3-11, 2011.

Energy performance of buildings—Calculation of energy use for space heating and cooling, ISO 13790:2008, 2 pages. Accessed on Apr. 11, 2016. [Online]. Available http://www.iso.org/iso/catalogue_detail.htm%3Fcsnumber=41974.

Erickson, et al., "Thermovote: Participatory sensing for efficient building HVAC conditioning," in Proc. 4th ACM Workshop Embedded Sens. Syst. Energy Efficiency Build. Toronto, ON, Canada, pp. 9-16, 2012.

Erol-Kantarci et al., "Wireless sensor networks for cost-efficient residential energy management in the smart grid," IEEE Trans. Smart Grid, vol. 2, No. 2, pp. 314-325, Jun. 2011.

Feldmeier, et al., "Personalized HVAC control system," in Proc. Internet Things (IOT), Tokyo, Japan, 2010, pp. 1-8.

Ghahramani, et al., "A knowledge based approach for selecting energy-aware and comfort-driven HVAC temperature set points," Energy Build., vol. 85, pp. 536-548, Dec. 2014.

Gomes, et al., "A multiple objective approach to direct load control using an interactive evolutionary algorithm," IEEE Trans. Power Syst., vol. 22, No. 3, pp. 1004-1011, Aug. 2007.

Gouveia, et al., "Coordinating storage and demand response for microgrid emergency operation," IEEE Trans. Smart Grid, vol. 4, No. 4, pp. 1898-1908, Dec. 2013. abstract.

Harsha, et al., "A framework for the analysis of probabilistic demand response schemes," IEEE Trans. Smart Grid, vol. 4, No. 4, pp. 2274-2284, Dec. 2013.

Herter, "Residential implementation of critical-peak pricing of electricity," Energy Policy, vol. 35, No. 4, pp. 2121-2130, Apr. 2007.

Hewlett, et al., "WESBES: A wireless embedded sensor for improving human comfort metrics using temporospatially correlated data," in Proc. 5th Int. Symp. Resilient Control Syst. (ISRCS), Salt Lake City, UT, USA, 2012, pp. 31-36.

Hiyama, et al., "Neural network based estimation of maximum power generation from PV module using environmental information," IEEE Trans. Energy Convers., vol. 12, No. 3, pp. 241-247, Sep. 1997.

Inoue, et al., "Network architecture for home energy management system," IEEE Trans. Consum. Electron, vol. 49, No. 3, pp. 606-613, Aug. 2003.

Katipamula, et al., "Evaluation of residential HVAC control strategies for demand response programs," ASHRAE Trans., vol. 112, No. 1, pp. 535-546, 2006.

Laustsen, "Energy efficiency requirements in building codes, energy efficiency policies for new buildings," Int. Energy Agency, Mar. 2008, 85 pages. [Online]. Available https://www.iea.org/publications/freepublications/publication/Building_Codes.pdf.

Li, et al., "Integrating home energy simulation and dynamic electricity price for demand response study," IEEE Trans. Smart Grid, vol. 5, No. 2, pp. 779-788, Mar. 2014.

Lu, "An evaluation of the HVAC load potential for providing load balancing service," IEEE Trans. Smart Grid, vol. 3, No. 3, pp. 1263-1270, Sep. 2012.

Martner, et al., "Five-day temperature forecasts from Denver television stations and newspapers," Nat. Weather Dig., vol. 23, No. 3, pp. 9-19, Sep. 1999.

Molderink, et al., "Management and control of domestic smart grid technology," IEEE Trans. Smart Grid, vol. 1, No. 2, pp. 109-119, Sep. 2010.

Murakami, et al., "Field experiments on energy consumption and thermal comfort in the office environment controlled by occupants' requirements from PC terminal," Build. Environ., vol. 42, No. 12, pp. 4022-4027, 2007.

North American Electric Reliability Corporation. (Feb. 2007). Demand Response Discussion for the 2007 Long-Term Reliability Assessment. Accessed on May 18, 2013, 9 pages. [Online]. Available: http://www.naesb.org/pdf2/dsmee052407w4.pdf.

Oldewurtel, et al., "Stochastic model predictive control for building climate control," IEEE Trans. Control Syst. Technol., vol. 22, No. 3, pp. 1198-1205, May 2014.

Oldewurtel, et al., "Use of model predictive control and weather forecasts for energy efficient building climate control," Energy Build., vol. 45, pp. 15-27, Feb. 2012.

Pumping and Agricultural Real-Time Pricing, Southern California Edison, Rosemead, CA, USA, 2010, 3 pages.

Ruiz, et al., "A direct load control model for virtual power plant management," IEEE Trans. Power Syst., vol. 24, No. 2, pp. 959-966, May 2009.

Samadi, et al., "Optimal real-time pricing algorithm based on utility maximization for smart grid," in Proc. IEEE Int. Conf. Smart Grid Commun., Gaithersburg, MD, USA, pp. 415-420, 2010.

Samadi, et al., "Tackling the load uncertainty challenges for energy consumption scheduling in smart grid," IEEE Trans. Smart Grid, vol. 4, No. 2, pp. 1007-1016, Jun. 2013.

Široký, et al., "Experimental analysis of model predictive control for an energy efficient building heating system," Appl. Energy, vol. 88, No. 9, pp. 3079-3087, Sep. 2011.

Taylor, et al., "A single-station approach to model output statistics temperature forecast error assessment," Weather Forecast. Amer. Meteorol. Soc., vol. 20, No. 6, pp. 1006-1020, Dec. 2005.

Tiptipakorn, et al., "A residential consumer-centered load control strategy in real-time electricity pricing environment," in Proc. 39th North Amer. Power Symp., Las Cruces, NM, USA, 2007, pp. 505-510.

Triki, et al., "Dynamic pricing of electricity in retail markets," Quart. J. Oper. Res., vol. 7, No. 1, pp. 21-36, Mar. 2009.

Wu, et al., "Real-time scheduling of residential appliances via conditional risk-at-value," IEEE Trans. Smart Grid, vol. 5, No. 3, pp. 1282-1291, May 2014.

Yi, et al., "Real-time opportunistic scheduling for residential demand response," IEEE Trans. Smart Grid, vol. 4, No. 1, pp. 227-234, Mar. 2013.

Yoon, et al., "Dynamic demand response controller based on real-time retail price for residential buildings," IEEE Trans. Smart Grid, vol. 5, No. 1, pp. 121-129, Jan. 2014.

Zhang, et al., "Aggregate model for heterogeneous thermostatically controlled loads with demand response," in Proc. IEEE Power Energy Soc. Gen. Meeting, San Diego, CA, USA, 2012, pp. 1-8.

* cited by examiner

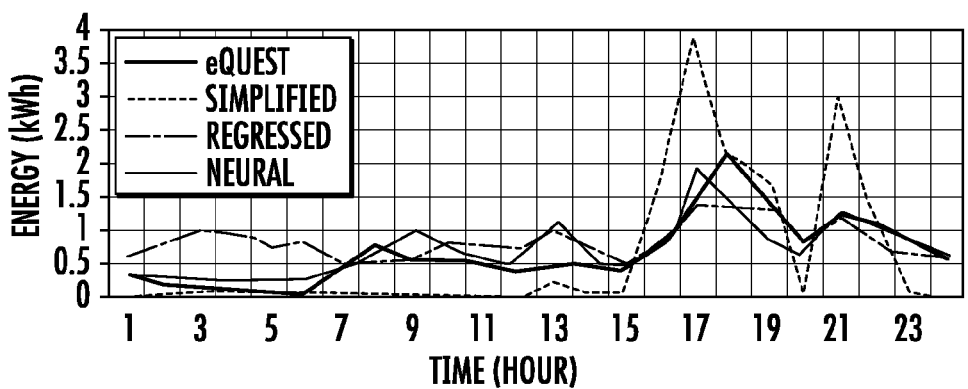
DAY 3 (DAY 1&2 DATA ARE USED TO GENERATE NN AND REGRESSION MODELS)
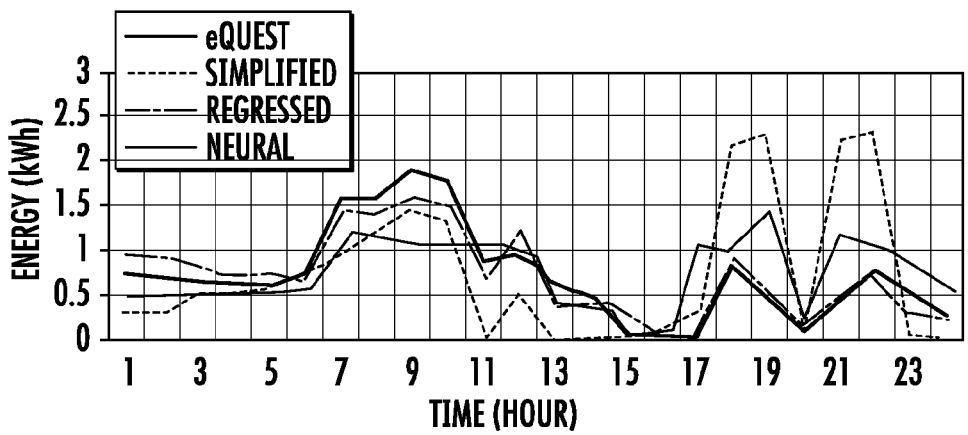
DAY 5 (DAY 1-4 DATA ARE USED TO GENERATE NN AND REGRESSION MODELS)
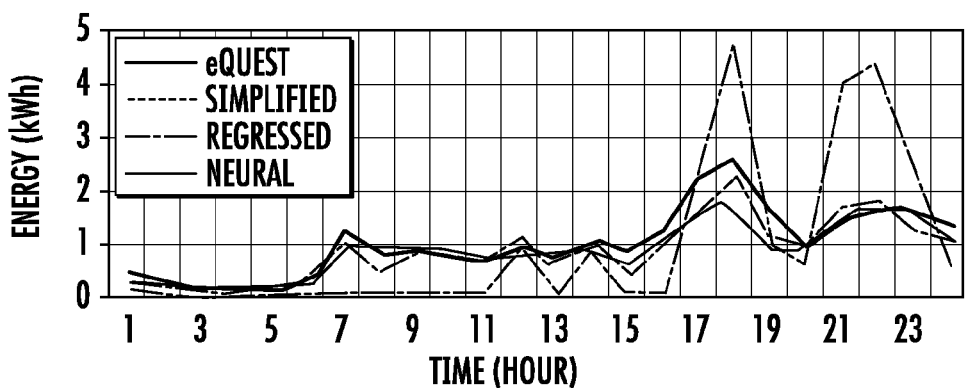
DAY 7 (DAY 1-6 DATA ARE USED TO GENERATE NN AND REGRESSION MODELS)
*FIG. 10*

FIG. 11    HOURLY AND TOTAL COSTS

FIG. 15 HOURLY AND TOTAL COSTS

SYSTEMS AND METHODS FOR MODELING ENERGY CONSUMPTION AND CREATING DEMAND RESPONSE STRATEGIES USING LEARNING-BASED APPROACHES

CROSS REFERENCE TO RELATED APPLICATION

This application claims priority to U.S. Provisional Patent Application No. 61/944,669 filed Feb. 26, 2014, and entitled "Systems and Methods for Modeling Energy Consumption and Creating Demand Response Strategies Using Learning-Based Approaches," the content of which is herein incorporated by reference in its entirety.

GOVERNMENT LICENSE RIGHTS

This invention was made with government support under NSF #1059265 project awarded by U.S. National Science Foundation. The government has certain rights in the invention.

BACKGROUND

Electricity consumption in residential markets will undergo fundamental changes in the next decade due to the emergence of smart appliances and home automation. A key requirement for the smart appliances within the smart grid framework is the demand response (DR). The North American Electric Reliability Corporation has defined demand response as changes in electricity usage by end-use customers from their normal consumption patterns in response to changes in the price of electricity (price-responsive DR), or to incentive payments designed to induce lower electricity use at time of high wholesale market prices or when system reliability is jeopardized (curtailable DR).

Electric utility companies typically use hourly real-time price (RTP) or day-ahead price (DAP) structure in their dynamic pricing programs. In North America, Ameren Focused Energy, serving about 2.4 million electric customers in Illinois and Missouri, has very detailed RTP and DAP tariffs posted on their website since Jun. 1, 2008 for both day-ahead and real-time markets. The day-ahead market produces financially binding schedules for the production and consumption of electricity one day before the operating day. The real-time market reconciles any differences between the amounts of energy scheduled day-ahead and the real-time load, market participant re-offers, hourly self-schedules, self-curtailments and any changes in general, real-time system conditions. Therefore, the DAP structure provides valuable information for price-sensitive loads while the RTP structure gives useful information for curtail operations.

For a typical home in the United States, home appliances are responsible for an important part of the energy bills. These appliances may include home heating, ventilation, and air conditioning system (HVAC), water heaters, clothes washers and dryers, dishwashers, refrigerator and freezers, electric stoves and/or ovens, coffee maker, home electric drive vehicle charging system, and lights, for example. For each energy consuming appliance, key factors affecting household energy consumption include: 1) appliance load level, 2) when and how long an appliance is used, and 3) how much unwanted heat could be generated when using the appliance. For a flat electricity price structure, a customer would use an appliance whenever it is needed. However, for a dynamic electricity price structure, customers are encouraged to optimize energy consumption of their DR capable appliances.

Typically, the HVAC system is one of the more challenging appliances for a DR strategy. Traditionally, the thermostat of a HVAC unit is set at 71° or 72° for a typical house in the United States. However, in a dynamic price framework, the thermostat setting is regulated according to the real-time price information.

In modeling energy consumption of a residential house, the amount of energy consumed by the HVAC system is typically the most dominant part. The heat load that the HVAC system must overcome is mainly generated in three ways: conduction, convection, and radiation. In most conventional DR studies, the heat load of a residential house is computed based on simplified approaches that typically only consider conduction. However, actual energy consumption of a residential house is much more complicated, which can be affected by geographical location, design architecture, window arrangements, insulation materials, occupants, weather, season, etc. and can change from one day to another.

A key component for a successful price-responsive DR program is a home automation system (HAS). Basically, a HAS receives information about weather forecast, dynamic electricity pricing, device operating characteristics, usage requests, etc., and autonomously makes control decisions and sends control actions to smart appliances.

However, a great challenge for the HAS to establish an optimal price-responsive DR strategy is how to accurately model and estimate the energy consumption of a residential house in variable weather conditions and a dynamic pricing environment. As noted above, in existing technologies, many DR techniques are developed based on simplified energy consumption models. For example, a strategy to minimize the cost for electricity consumption has been proposed in which the energy consumption of a house is modeled based on simple conduction heat transfer equations. For example, a simplified equivalent and thermal parameter (ETP) modeling approach is used in GridLAB-D, a distribution system simulator, to estimate thermal loads of a residential house based on first principles. Further, a quasi-steady-state approach has been adopted to estimate hourly building electricity demand, in which the building thermal model is built based on an equivalent resistance-capacitance network. The hourly energy consumption is determined through an optimization strategy under the constraints of several predefined customer load levels which include maximum and minimum hourly demands, minimum daily consumption, and ramping up and down limits.

Other approaches to DR strategies include a heuristic approach and an "optimal" DR approach. FIG. 1 illustrates a flow diagram of a heuristic DR strategy for operation of an HVAC system during the summer. The heuristic DR strategy is a variable temperature setting approach. During the summer time, for instance, the air conditioner should be operated the coolest possible near the lower boundary, $T_{min}$ of the ASHRAE summer comfort zone when the RTP is lower than a predefined value. On the other hand, the HVAC is operated the hottest possible near the upper boundary, $T_{max}$, of the ASHRAE summer comfort zone. The HVAC is operated between these two boundaries depending on the RTP tariff. In FIG. 1, $P_{real}$ is the RTP for the current time frame i. $P_{min}$ is a minimum price point, $P_{max}$ is a maximum price point, and $P_1$-$P_n$ are intermediate price points between $P_{min}$ and $P_{max}$.

Assuming there are n temperature settings between $T_{max}$ and $T_{min}$, then, the price and thermostat settings for summer time are calculated by equations (1) and (2) below.

$$P_i = P_{max} - PR_{diff} \tan h(k \cdot i \cdot PR_{diff}) \quad (1)$$

$$T_i = T_{max} - (T_{max} - T_{min})/n \cdot i \quad (2)$$

$$T_i = T_{max} + (T_{max} - T_{min})/n \cdot i \quad (3)$$

The basic concept is that the thermostat setting is determined through a combined consideration of maximum and minimum real-time price and price distribution over a day. In equation (1) above, k is a constant obtained from a price distribution study for different seasons, and $PR_{diff} = P_{max} - P_{min}$, where $P_{max}$ and $P_{min}$ correspond to maximum and minimum electricity prices of a day, respectively. For winter time, a modification is necessary with $T_{max}$ and $T_{min}$ corresponding to $P_{min}$ and $P_{max}$, respectively, and the price and thermostat settings are calculated by equations (1) and (3) above. Similarly, $T_1$, $T_2$, and $T_n$ correspond to $P_1$, $P_2$, and $P_n$, respectively.

The DR strategy obtained according to FIG. 1 may be good some days but bad other days. Another problem with the heuristic DR strategy is that the algorithm is unable to take the advantage of low price periods to pre-cool down a house significantly.

The optimal DR approach attempts to determine the optimal thermostat setting strategy for a given dynamic price of a day, and thus is more efficient than the heuristic DR approach. To develop an optimal DR strategy, the following nonlinear programming formulation is used:

$$\text{Minimize: } C = \sum_i p_i \cdot Q_i \quad (4)$$

$$\text{Subject to: } 0 \leq Q_i \leq Q_{max}, T_{min} \leq T_i^I \leq T_{max}$$

where $T_{min} = T_{ideal} - d$, $T_{max} = T^{ideal} + d$, d is the acceptable temperature deviation, i represents a time slot in one hour, $T_i^I$ is the room temperature in hour i, C is the electricity cost during a day, $p_i$ stands for the electricity price in hour i, $Q_i$ signifies the energy consumed by the HVAC unit in hour i, and $Q_{max}$ denotes the maximum energy that can be consumed by the HVAC unit. Traditionally, the energy consumed by the HVAC $Q_i$ is modeled as a function of room temperature $T_i^I$ and outdoor temperature $T_i^O$. Equation (5) below shows a simplified thermal model of a residential house:

$$T_{i+1}^I = \epsilon \cdot T_i^I + (1-\epsilon)(T_i^O - \eta \cdot Q_i/A) \quad (5)$$

where $\eta$ is the efficiency of the HVAC unit, $\Sigma$ is the system inertia, and A is the thermal conductivity. However, in reality, the relationship between indoor and outdoor temperatures and energy consumed by the HVAC unit is much more complicated than Equation (5) so that actual energy consumption of the HVAC unit could deviate greatly from results generated by using Equation (5), which affects the DR efficiency. Therefore, an intelligent mechanism that can identify and update an energy consumption model daily for a residential house is needed for developing an optimal DR strategy.

BRIEF SUMMARY

According to various implementations, a DR strategy development system is described that can effectively model the energy consumption of regulatable energy consumption units in a house using a learning based approach that is based on actual energy usage data collected over a period of days. This modeled energy consumption may be used with day-ahead energy pricing and the weather forecast for the location of the house to develop a DR strategy that is more effective than prior DR strategies.

According to certain implementations, a system for creating a demand response strategy for a building is provided. The system includes a computing device that includes a memory and a processor. The memory is configured for storing actual usage data associated with an energy consuming unit in the building for one or more time windows on each of days i through j, wherein day i is the first day for which data is stored and j is the most recent day for which data is stored. The processor is configured for: (1) receiving the actual usage data from the memory; (2) executing at least one computer-based learning system to model energy consumption for day j+1 based on at least the actual usage data for the energy consumption unit, and (3) generating a demand response strategy for the energy consuming unit for day j+1 based on the modeled energy consumption and next-day energy pricing for each time window for day j+1. The computer-based learning system may include a neural network system or a regression based system, for example.

In one implementation, the energy consumption unit is an HVAC system, and the actual usage data includes an outdoor temperature for each time window on days i through j, an indoor temperature for each time window on days i through j, and a thermostat setting for each time window on days i through j. In this implementation, the processor is further configured for using one or more of the computer based learning systems to model energy consumption of the HVAC system for day j+1 based on the weather forecast for day j+1 and the actual usage data for days i through j. In addition, generating the demand response strategy includes generating thermostat settings for one or more time windows on day j+1 such that energy costs for day j+1 are minimized.

According to another implementation, an energy consumption management system is provided. The energy consumption management system includes one or more local receivers and a central computer computing system. The one or more local receives are disposed adjacent a respective one of one or more energy consuming units in a building, and each local receiver includes a processor configured for receiving usage instructions for the adjacent energy consuming unit and causing the usage instructions to be executed for the energy consuming unit. The central computing system includes a memory and a processor. The memory is configured for storing actual usage data associated with at least one energy consuming unit in the building for one or more time windows on each of days i through j, wherein day i is the first day for which data is stored and day j is the most recent day for which data is stored. The processor is configured for: (1) receiving the actual usage data from the memory; (2) executing at least one computer-based learning system to model energy consumption for day j+1 based on at least the actual energy usage data for the energy consumption unit; (3) generating a demand response strategy for the energy consuming unit for day j+1 based on the modeled energy consumption and next-day energy pricing for each time window for day j+1; and (4) communicating the demand response strategy of the energy consuming unit to the local receiver associated with the energy consuming unit. The demand response strategy comprises the usage instructions. The computer-based learning system may include a neural network system or a regression based system, for example.

According to yet another implementation, a computational experiment system for comparing demand response strategies is provided. The system includes a computing device, and the computing device includes a memory and a processor. The memory is configured for storing simulated usage data associated with an energy consuming unit in a building for one or more time windows on each of days i through j, wherein day i is the first day for which data is stored and j is the most recent day for which data is stored. The processor is configured for: (1) receiving the simulated usage data from the memory; (2) executing at least one computer-based learning system to model energy consumption for day j+1 based on the simulated usage data; (3) generating a first demand response strategy for day j+1 based on the modeled energy consumption and next day energy price data; (4) generating a second demand response for day j+1; and (5) generating a display indicating energy costs associated with the first and second demand response strategies for day j+1. The computer-based learning system may include a neural network system, a regression based system, a non linear programming approach, and/or a particle swarm optimization approach, for example.

The second demand response strategy may be generated using a heuristic approach based on real time pricing data, according to some implementations. In other implementations, the energy consuming unit is an HVAC unit having an efficiency $\eta$, system inertia $\epsilon$, and thermal conductivity A, and the second demand response strategy is based on the following simplified thermal model approach:

$$T_{i+1}^I = \epsilon \cdot T_i^I + (1-\epsilon)(T_i^O - \eta \cdot Q_i/A).$$

In other implementations, the second demand response strategy may be generated using a nonlinear programming approach or a particle swarm optimization approach.

The processor may also be configured for: (1) receiving an energy price for each time window on day j+1, (2) generating a demand response strategy for the energy consuming unit for day j+1 based on the energy price for each time window on day j+1, (3) calculating a respective cost for operating the energy consuming unit on day j+1 based on the first and second demand response strategies and the energy pricing, and (3) displaying a projected cost for energy usage for the energy consumption unit associated with each respective schedule associated with each energy consumption model.

BRIEF DESCRIPTION OF THE DRAWINGS

The components in the drawings are not necessarily to scale relative to each other and like reference numerals designate corresponding parts throughout the several views:

FIGS. 10-15 illustrate charts comparing simulated and modeled energy usage and energy pricing using various approaches according to various implementations.

DETAILED DESCRIPTION

Figure 1:
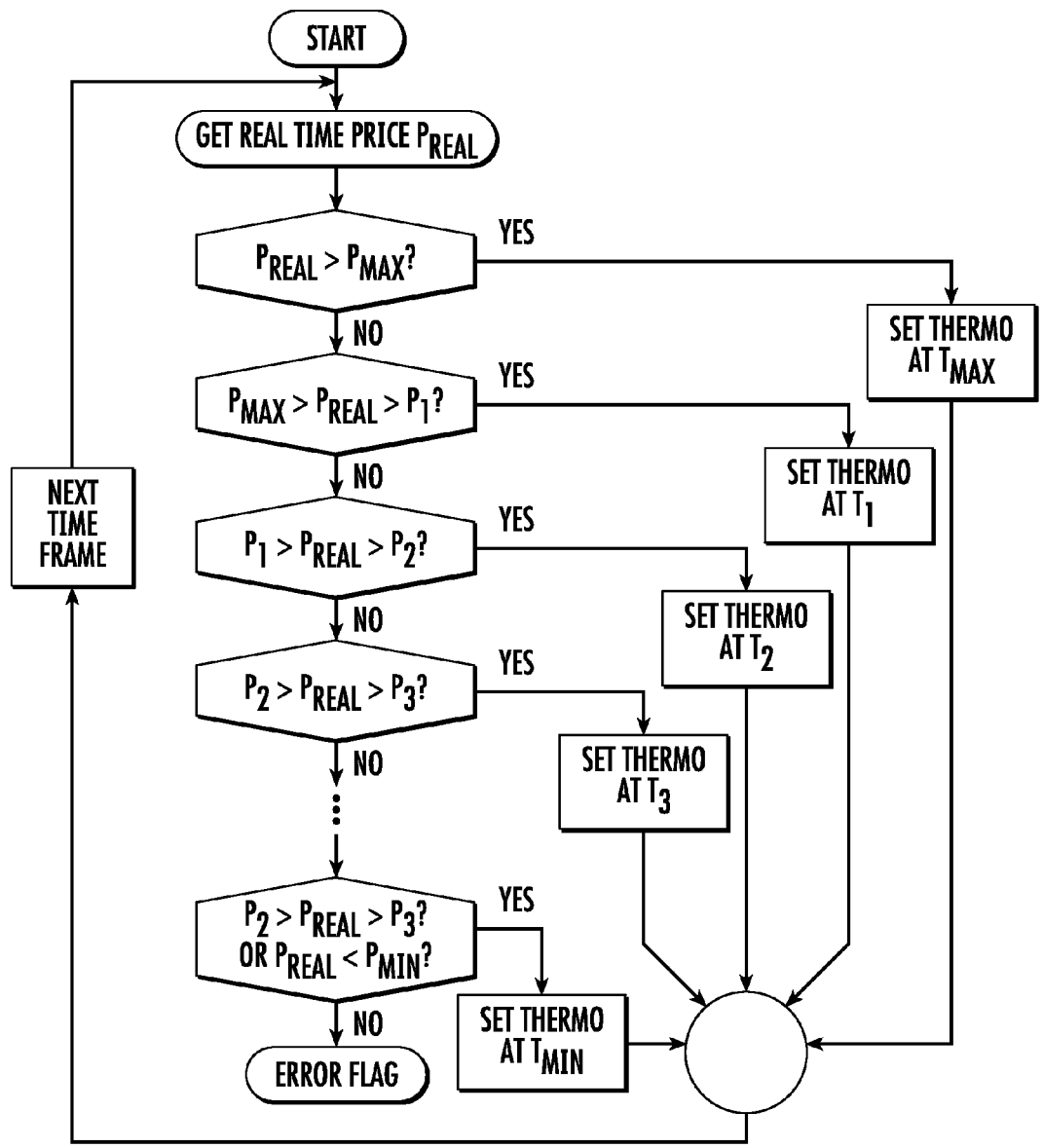
FIG. 1 illustrates a flow chart of a heuristic DR strategy for operation of an HVAC system during the summer.

According to various implementations, a DR strategy system is described that can effectively model the energy consumption and generation of a house using a learning based approach that is based at least in part on actual energy usage data collected over a period of days. This modeled energy consumption may be used with day-ahead energy pricing and a weather forecast for the location of the house to develop a DR strategy that is more effective than prior DR strategies. One exemplary goal of the DR strategy system is to minimize net energy cost to the consumer. This goal may be met by reducing the amount of energy consumed during peak tariff time periods and identifying optimal time periods for storing, using, or selling energy generated from renewable energy sources associated with the house.

In particular, interactive learning mechanisms are disclosed that are configured to learn and model energy consumption of a residential house using substantially real-time measured or simulated energy consumption data. Due to the learning, the model can accurately capture the thermal behavior of a house for different seasons, users, and weather conditions. For example, the thermal storage characteristics of the house may be captured by the learning mechanisms. The model may then be used to develop a cost effective DR strategy for one or more energy consuming units in the house, such as the HVAC system, other appliances, or other energy consuming devices in the house, and any energy generating units associated with the house.

To more accurately model the energy consumption for a household and identify an optimal DR strategy for the energy units in the home, energy usage and generation from regulatable loads, fixed deferrable loads, and future fixed non-deferrable loads and sources may be optimized separately and then combined to achieve a final, robust optimal solution. Regulatable loads includes energy loads for which energy usage may be regulated but not delayed. Examples of regulatable loads include the HVAC system, hot water heater(s), and battery(s) storing electricity generated from renewable energy sources associated with the house (e.g., solar photovoltaic panels, such as roof-top solar photovoltaic panels, and wind turbines). Fixed deferrable loads includes energy loads for which energy usage may be deferred but not regulated. Examples of fixed deferrable loads include the clothes washer and dryer, dishwasher, and vehicle charging station. Future fixed non-deferrable loads include energy loads for which energy usage or generation cannot be regulated or deferred. Examples of future fixed non-deferrable loads include lights, microwave, home office equipment, refrigerator, oven/stove, and energy generated from any renewable energy sources associated with the house.

Energy units having regulatable loads and fixed deferrable loads are subject to management by the HAS using a DR policy generated the day before. The DR policy may be adjusted in the current day based on real time pricing (RTP) data, if available. For example, the DR policy for a regulatable load may be solved using linear or nonlinear programming methods, and DR policy for fixed deferrable loads may be solved using an integer programming technique (e.g., binary integer programming).

Figure 19:
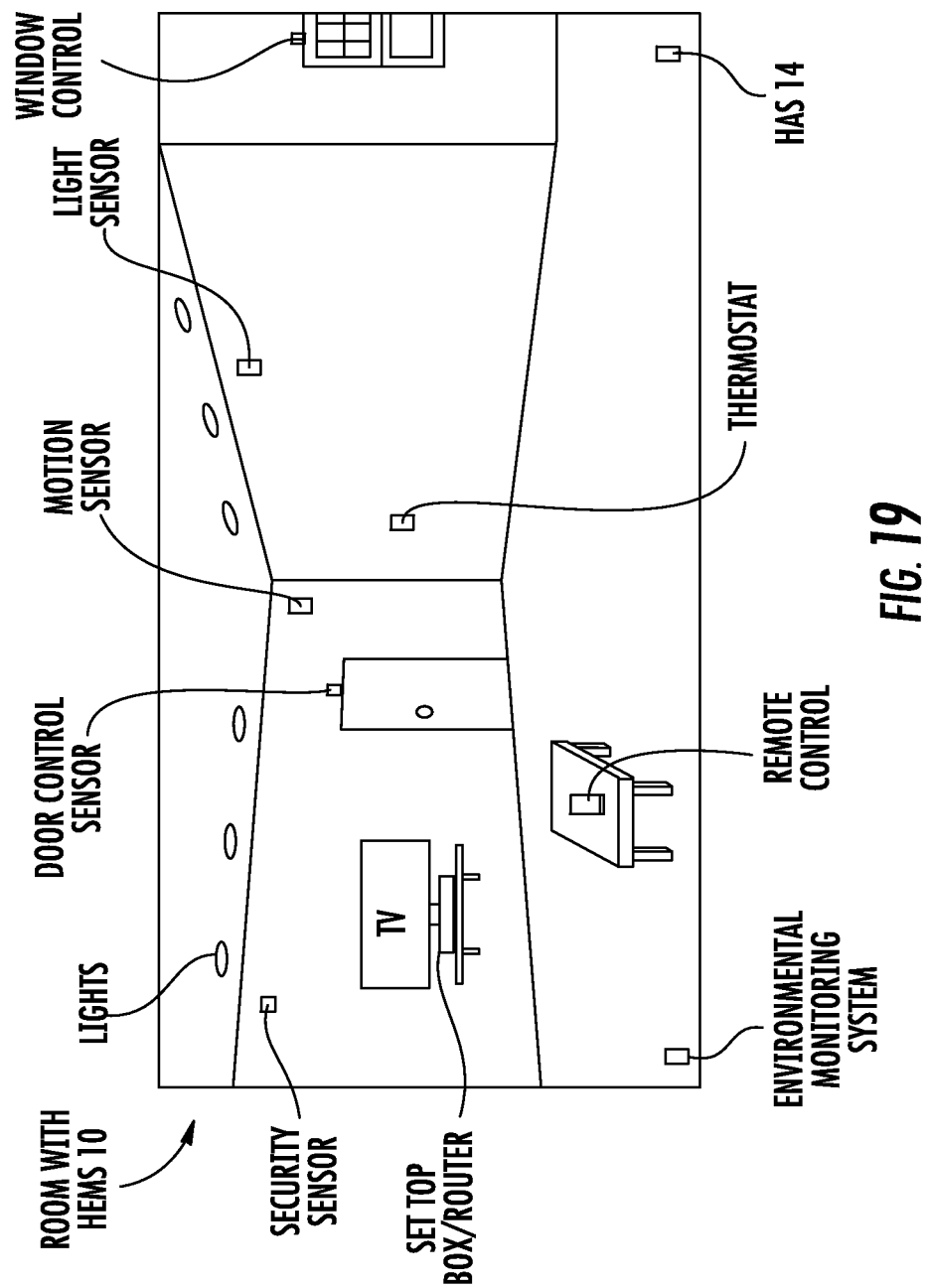
FIG. 19 illustrates a room inside of a building having various electrical components and sensors, according to one implementation.

However, energy usage by energy units having future fixed non-deferrable loads may not be deferred or regulated. Instead, energy usage by at least a portion of these future fixed non-deferrable load energy units may be optimized using sensor technology as part of the DR policy for minimizing energy usage. For example, a sensor may be associated with one or more energy consuming units having a future fixed non-deferrable load that turns off the unit when it is not needed or after a predefined time period or switches the energy consuming unit into an energy saving or sleep mode when the HEMS 10 senses that no people are in the room or senses that the appliance is not in use. The implementation shown in FIG. 19 includes a motion sensor, a door control sensor, and a security sensor, for example.

The amount of energy generated by a photovoltaic (PV) system or other renewable resource (e.g., wind turbines) may be communicated to the HAS 14, and the HAS 14 may determine whether to use, store, or sell the energy generated based on the DR policy for the regulatable and deferrable energy loads in the home, the RTP tariff for selling energy to the electrical grid, and the remaining capacity of the battery used to store the energy for later use. In some implementations, the HAS 14 may treat the energy generated by the renewable resource as a future fixed generation source with a HAS generated dynamic pricing and the energy stored by the battery 7 as a regulatable load that is negative when discharging and positive when charging with a HAS generated dynamic pricing.

The HAS 14 may also include strategies to learn energy generation properties of renewable energy source systems, such as PVs and wind turbines, energy storage characteristics of batteries, and dynamic price tariffs for the home energy generation system and battery storage system so that the energy generation system and energy storage can be operated and coordinated with usage of other appliances for the maximum benefit of the home owner and to achieve the goal of having a zero energy home capability as much as possible.

For example, various implementations provide an optimal DR strategy for a household heat pump, or HVAC unit, that is based on day-ahead weather prediction, day-ahead electricity pricing, and a learned energy consumption model of the house. The DR strategy for the HVAC unit for the next day includes the thermostat settings for various time periods for the next day. The DR strategy for other appliances or energy consuming units having a fixed deferrable load may include a RTP tariff range for which operation of the unit is acceptable, a certain time period during which the appliance or energy consuming unit may be operated, and/or an acceptable operation cycle.

FIGS. 2, 3, and 16-18 illustrate various components of a home energy management system (HEMS) 10 according to various implementations. In particular, the system 10 includes a wireless home-area network 12 with an intelligent HAS 14 and one or more distributed wireless receivers 16a, 16b, 16c associated with each energy consuming unit 18a, 18b, 18c, such as an appliance, electric drive vehicle (EV) charging system, one or more lights, or home office equipment. The HEMS 10 may also include one or more wireless sensors 19 associated with energy units having future fixed non-deferrable loads. The HEMS 10 manages energy usage for the energy consuming and generating units in the house.

The HAS 14 receives information from each distributed, local receiver 16a-16c about energy usage of the energy consuming unit 18a-18c, respectively, over the home area network 12 and stores the data in a memory, such as queues 26 or other data structures, on a first in, first out (FIFO) basis. The queues 26 are configured to hold data for days 1 through n. In one implementation, n may be eight days. The data is collected by the HAS 14 in substantially real-time, such as every hour, minute, second, or other appropriate time period. The HAS 14 may also receive inside and outside temperatures 25 and thermostat settings for various time periods during the current day. The HAS 14 also receives predicted weather 20 and electricity price information 22 for the next day via an external network 24, such as the Internet.

To implement the DR policy for fixed deferrable loads, the HAS 14 may include a control block and a next-day DR block. The control block for the fixed deferrable loads provides control commands to local receivers at the present day while a local receiver defers the operation of an energy consuming unit, based on the control commands received from the HAS 14. The next-day DR block for fixed deferrable loads may include an optimization module that receives DAP tariff information from the utility company over a network, such as the Internet or private network, or a smart meter attached to the house as well as day-ahead dynamic price tariffs determined by the HAS 14 for home solar PV system and battery storage system and executes an optimization routine to identify the best time slot to operate a deferrable unit for the next day. In certain implementations, an integer programming strategy is used to identify the most cost effective time slot(s) to operate the fixed deferrable load units. Electric utility DAP tariff information may include other non-RTP tariffs, such as time of use (ToU) tariffs and critical peaking price (CPP) tariffs.

The HAS 14 may include a control block and a next-day DR block for regulatable loads. The control block for regulatable loads provides control commands to local receivers at the present day based on a DR policy generated one day ahead while a local receiver regulates the operation of a regulatable energy unit, depending on the control commands received from the control block. The next-day DR block for regulatable loads receives information from a local receiver about energy usage of an appliance at the present day as well as predicted weather and electricity price information and dynamic price tariffs determined by the HAS for the home solar PV system and battery storage system one day ahead and determines a DR policy for the next day. The DR policy determined by the next-day DR block for regulatable loads implements the demand response of those units for the maximum benefit of the residential consumer at any weather condition. The ability to identify the energy consumption models of those units through data-driven learning mechanisms, such as those described above and shown in FIG. 2, is an important step for the next-day DR block, according to certain implementations. For example, an intelligent learning module of the HAS 14 models energy consumption for one or more regulatable loads based on the data stored in the queues 26.

The next-day DR block for regulatable loads may include an optimization module that creates a DR strategy for the next day that is based on the modeled next-day energy consumption and day-ahead energy pricing. For example, the DR strategies for the next day for regulatable units, such as the HVAC unit and the hot water heater, include a plurality of operational settings (e.g., thermostat settings for the HVAC unit and/or hot water heater) corresponding to various time periods for the next day. The next-day DR block for fixed deferrable loads may also include an optimization module that creates a DR strategy using the DAP or RTP data and time windows and price ranges that are predefined by the customer as being acceptable for operation of one or more of the other energy consuming units. The queues 26 may also store data from these energy consuming units. The optimization modules may be further configured for adjusting the DR strategy for the current day using real-time energy pricing, if available.

Figure 18:
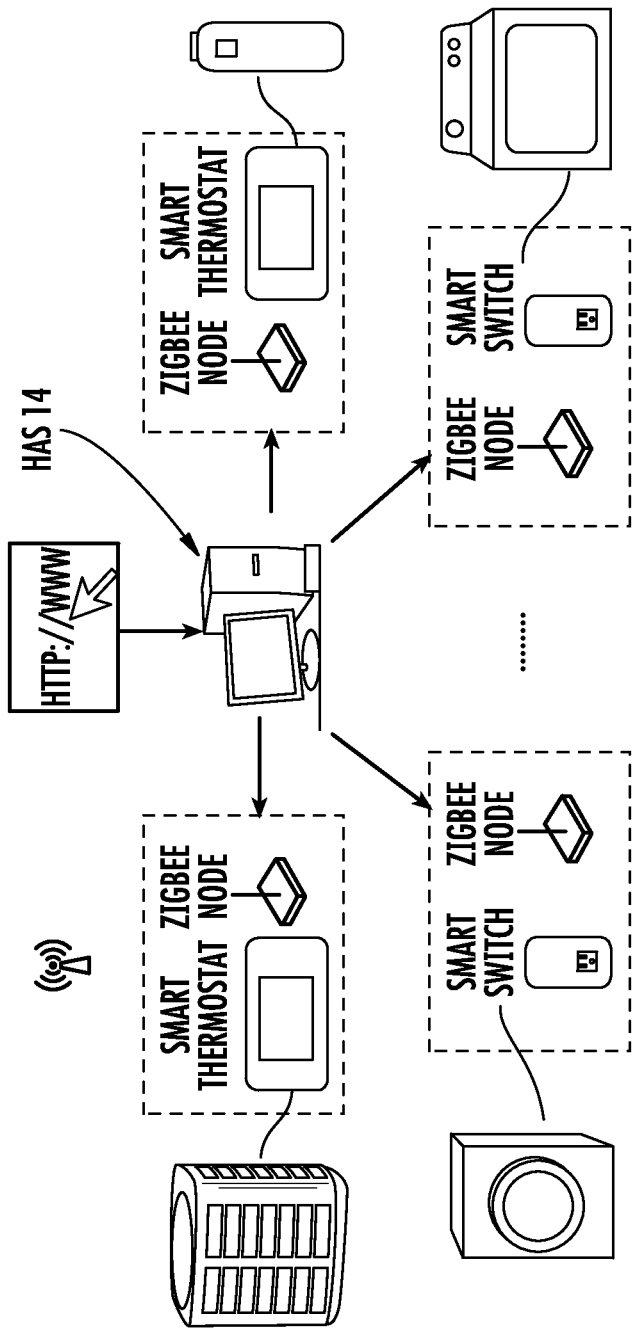
FIG. 18 is a schematic diagram illustrating several components of the home energy management system according to one implementation.

Control commands based on the DR strategy are communicated by the HAS 14 to local receivers 16a-16c via the home area network 12. The local receivers 16a-16c may discontinue the operation of their associated energy consuming unit 18a-18c to a later time period having a cheaper energy price or regulate the operation of the associated energy consuming units 18a-18c, depending on the control commands from the HAS 14. FIG. 18 illustrates an exemplary implementation in which the local receivers 16a-16c include ZIGBEE nodes and smart switches. However, in other implementations, other types of receivers may be used.

The substantially real-time DR system 10 is adaptive to implement the optimal demand response strategy for the maximum benefit of a residential consumer insubstantially any weather conditions. A key component of various implementations of the system is the ability to identify a substantially real-time HVAC energy consumption model that is adaptive to weather and seasonal conditions through learning-based computing approaches.

The HEMS 10 may also be configured for reporting usage conditions to a user, allow the user to activate or deactivate DR appliances, adjust temperatures (or ranges thereof) for regulatable appliances, accept time slot(s) for deferrable load appliances according to an incentive price tariff from a utility company. The HEMS 10 may communicate with the user via a wired interface or a wireless interface. For example, the HEMS 10 may include a display screen through which the user receives information from the HEMS 10 and an input device through which the user provides instructions to the HEMS 10. In other implementations, the HEMS 10 may communicate with the user via a smart phone application or other interface that is wirelessly in communication with the HEMS 10.

Exemplary Learning-Based DR Strategy System

Figure 4:
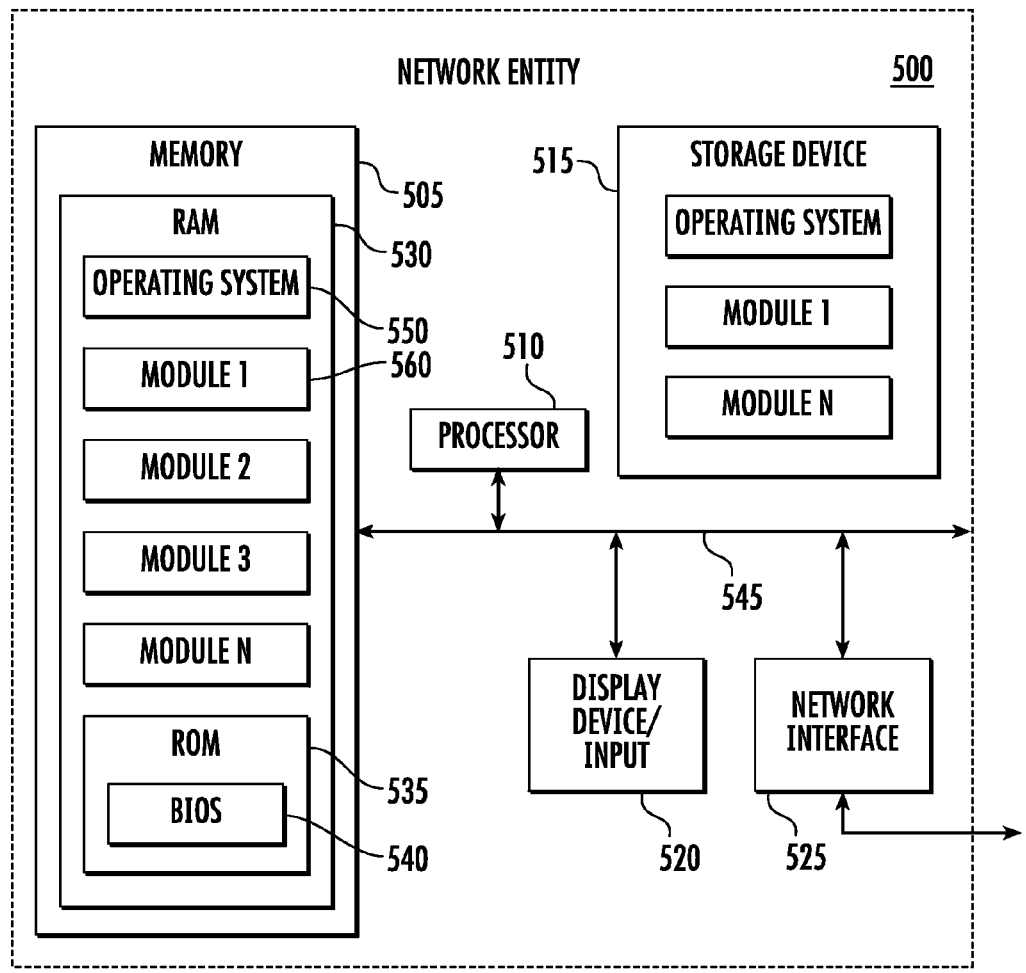
FIG. 4 illustrates a schematic diagram of an exemplary central server configured to implement at least a portion of the DR strategy system described in FIGS. 2 and 3, according to one implementation.

FIG. 4 illustrates a schematic diagram of a central server 500, or similar network entity, configured to implement a computer system, according to one implementation. The server 500 executes various functions of the HEMS 10 described above in relation to FIGS. 2 and 3 and below in relation to FIGS. 5A and 5B. For example, the server 500 may be the HAS 14 described above, or a part thereof. As used herein, the designation "central" merely serves to describe the common functionality the server provides for multiple clients or other computing devices and does not require or infer any centralized positioning of the server relative to other computing devices. As may be understood from FIG. 4, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above in relation to FIGS. 2 and 3 and below in relation to FIGS. 5A-6 and illustrated by the figures and other materials disclosed herein, such as executing various functions of the DR strategy system 10. According to various implementations, one or more of the modules may be executed by a digital computing system or portion thereof, such as a micro computer, digital signal processor chip, field programmable gate array (FPGA) system, PC, or other suitable computing device.

In one exemplary implementation, the server 500 includes the following modules: (1) a communication module for receiving data relevant to modeling energy consumption and energy pricing and communicating the DR strategy to the local receivers associated with the energy consuming units; (2) a learning module for modeling energy consumption based on relevant data using a computer implemented learning-based approach; (3) an optimization module for creating a next day DR strategy for regulatable loads based on DAP data and the modeled energy consumption from the learning module and for adjusting the DR strategy for the current day based on RTP data for the current day; (4) an optimization module for creating a next day DR strategy for fixed deferrable loads using the DAP or RTP data and time windows; and (5) a data management module for storing in queues in a memory actual energy consumption data, temperature data (indoor and outdoor), and thermostat settings for each time window for 1 through n days.

Learning Module

As noted above, the learning module models energy consumption based on relevant data using a computer-implemented learning-based approach. The learning-based approaches may include a neural network approach or a regression-based approach, for example. These exemplary approaches are described below beginning with the description of FIG. 6. In addition, other suitable learning mechanisms may be used. And, these learning mechanisms may be used for modeling energy generation characteristics of a renewable energy source, such as a PV system or a wind turbine system, and/or energy storage characteristics of a battery for storing energy generated by the renewable energy source.

Neural Network Approach

In a neural-network-learning-based approach, the model of the energy consumed by the HVAC $Q_i$ is obtained through a neural-network-based learning mechanism. Unlike the fixed model shown by Equation 5, the HVAC energy consumption model learned by the neural network is updated daily. Hence, it can more accurately capture the thermal behavior of a house at different seasons, users, weather conditions, etc. The neural network is trained by using a backpropagation algorithm, which includes multiple iterations until a stop criterion is reached. Thus, it is more computational expensive.

Figure 6:
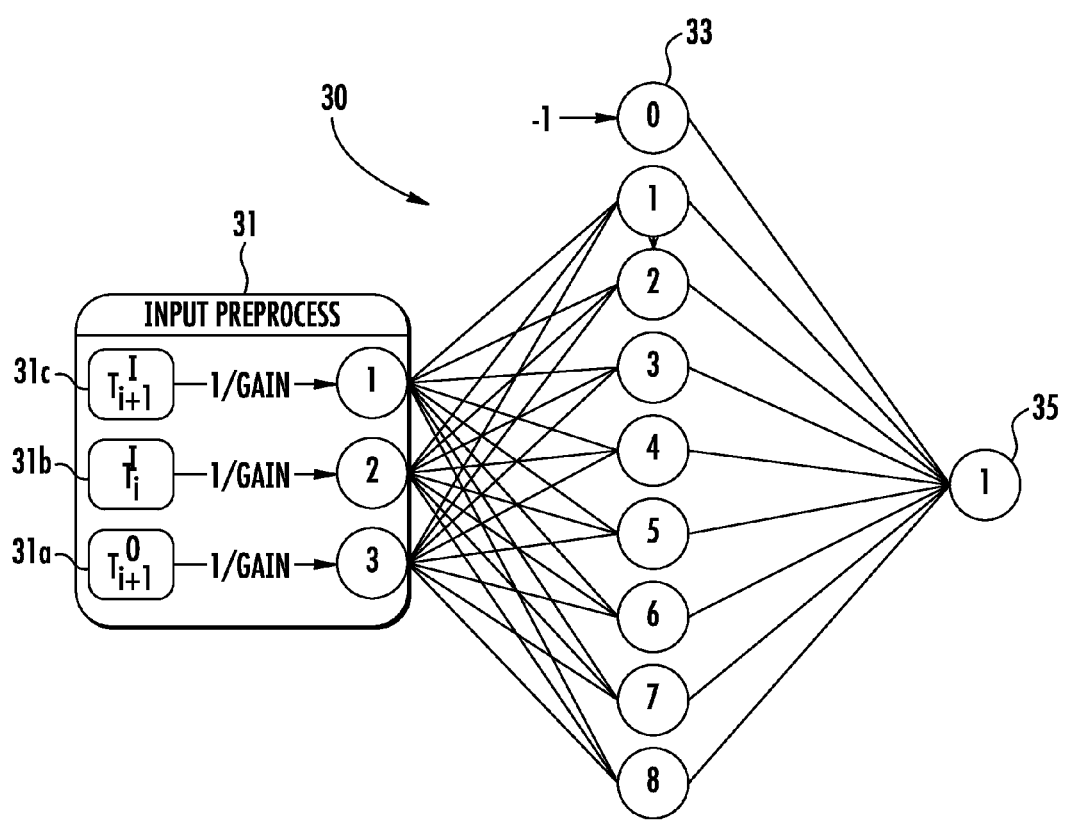
FIG. 6 illustrates a schematic diagram of the flow of data through a neural network according to one implementation.

One neural network learning approach is a multilayer perceptron (MLP). A MLP is an artificial neural network structure and may be useful in modeling HVAC energy consumption, for example. As shown in FIG. 6, an MLP includes a set of source nodes that make up the input layer, one or more layers of computation nodes, and an output layer. The input signal propagates through the network in a forward direction, on a layer-by-layer basis. The network exhibits a high degree of connectivity, determined by the weights of the network. Experiential knowledge for the network is acquired by the network through a learning process and stored in the network weights after it is trained.

For the learning purpose of HVAC energy consumption model, the MLP 30 shown in FIG. 6 includes three input nodes 31a, 31b, 31c, one computation layer 33 that includes eight nodes, and one output node 35. The three inputs nodes 31a, 31b, 31c of the network 30 receive the following data: 1) outside temperature $T_i^O$ in hour i (node 31a), 2) $T_i^I$ room temperature in hour i (node 31b), and 3) $T_{i+1}^I$ room temperature in hour i+1 (also represents the thermostat setting temperature in hour i) (node 31c). The network output is $Q_i$, signifying the energy consumed by the HVAC unit in hour i (FIG. 6). It is possible to add other inputs to the network to enhance the learning.

As shown in FIG. 6, the network learning is based on the data saved in four queues and is updated daily. The data saved in the four queues are corresponding to outside temperature ($T_i^O$), room temperature ($T_i^I$), thermostat setting temperature ($T_{i+1}^I$), and HVAC energy consumption ($Q_i$).

A MLP network can be used for a function approximation problem, in which the inputs to the network are equivalent to the predictor variables as shown in the regression model of Equation 8 below and the output of the network is equivalent to the predicted value. For a given problem, there is a cost function $\epsilon_T$, which is similar to the error sum of squares of Equation 7 (shown below) for the regression model, as the measure of training set learning performance. The objective of the learning process is to adjust the weights of the network so as to minimize $\epsilon_T$. A highly popular training algorithm known as the backpropagation algorithm is generally used to adjust the network weights until a stop criterion is reached.

After the network is trained, the neural network would provide a model that describes the relation of the HVAC energy consumption ($Q_i$) with the outside temperature ($T_i^O$), room temperature ($T_i^I$), and thermostat setting temperature ($T_{i+1}^I$) at a time frame i. This model is updated daily and then used by the optimization module to determine an optimal next-day DR strategy to operate the HVAC for the next 24 hours given the predicted outside temperature)($T_i^O$ and electricity price.

Regression Based Approach

In a regression-learning-based approach, the model of the energy consumed by the HVAC $Q_i$ is obtained through a regression-based learning mechanism. Compared to the fixed model in Equation 5, the regression model can also provide more accurate estimation of HVAC energy consumption that is close to the actual results, because the model is updated daily through the regression-based learning mechanism. With regard to the neural-network-based model, the regression-based learning is much faster because the parameters of the regression model can be solved directly.

Regression models quantitatively describe the variability among the observations by partitioning an observation into two parts. The first part of this decomposition is the predicted portion having the characteristic that can be ascribed to all the observations considered as a group. The remaining portion, called the residual, is the difference between the observed value and the predicted value and has to be ascribed to unknown sources. This can be expressed as $$y_i = f(x_i, \beta) = \epsilon_i \quad i=1, \ldots, n \quad (6)$$

where n is the number of the observations, $y_i$ is the ith observation, $x_i = (x_1, x_2, \ldots, x_k)$ is the predictor variable vector related to observation $y_i$, $\beta = (\beta_0, \beta_1, \ldots, \beta_p)$ is the parameter vector, and $\epsilon_i$ is the error associated with the ith observation.

The function $f(\cdot)$ is assumed to be smooth and estimated by fitting a polynomial or other types of functions. Fitting refers to calculating values of the parameters from a set of data. Similar to the neural network learning, the estimate $\hat{\beta}$, a least squares estimate of $\beta$, tries to minimize the error sum of squares shown by.

$$S(\hat{\beta}) = \sum_{i=1}^{n} (y_i - f(x_i, \hat{\beta}))^2, \quad (7)$$

Figure 2:
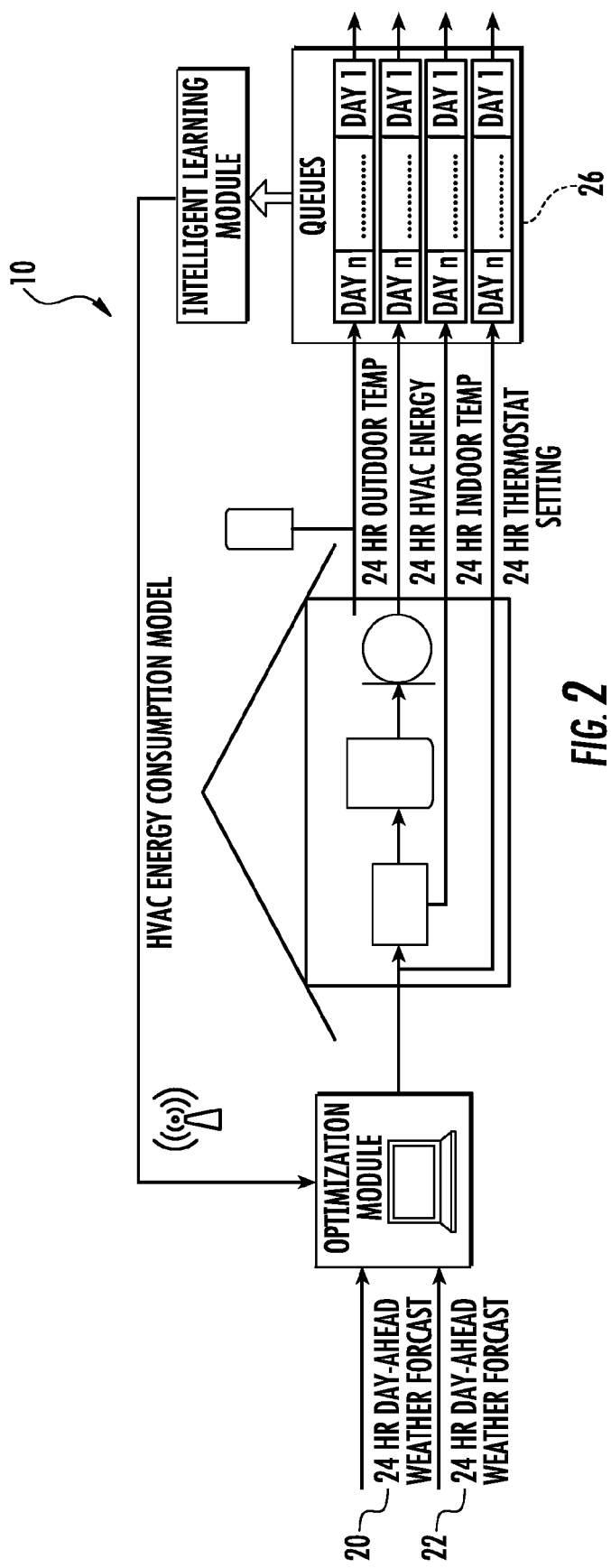
FIG. 2 illustrates a schematic diagram of a DR strategy system for an HVAC unit according to one implementation.
Figure 3:
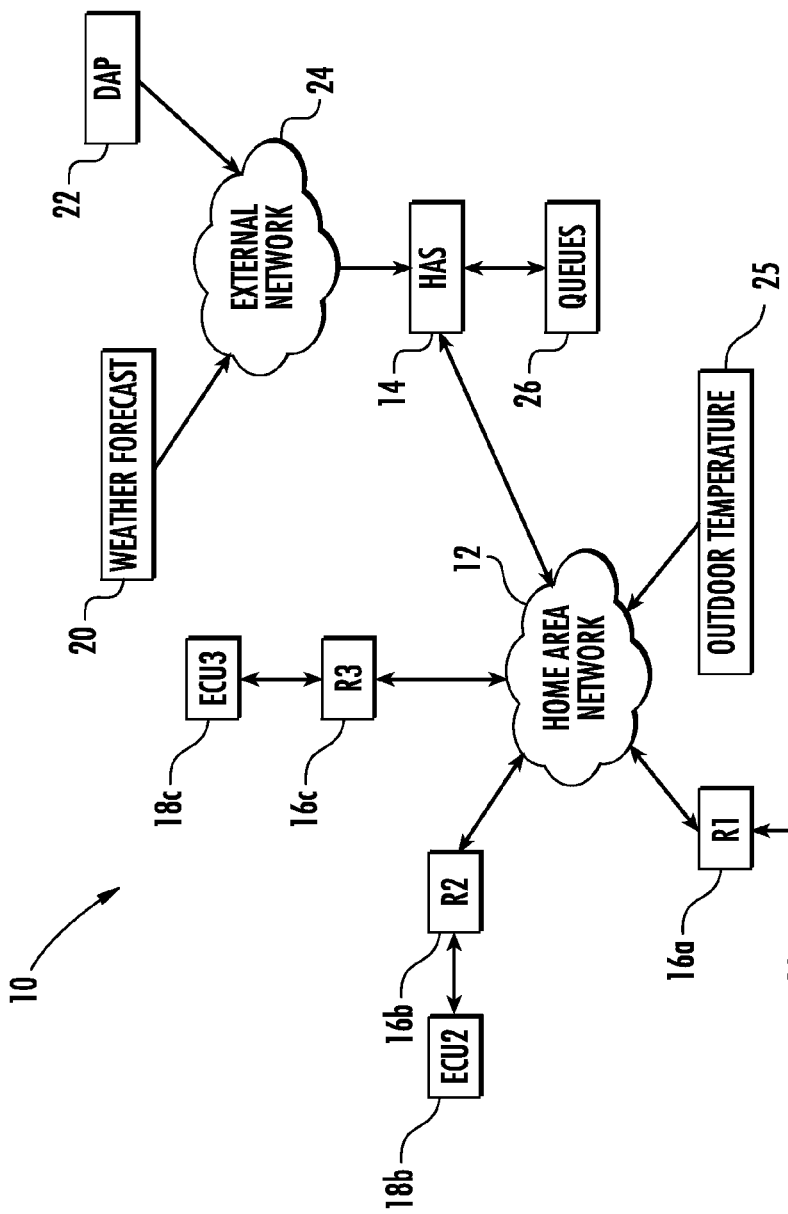
FIG. 3 illustrates a schematic network diagram of the DR strategy system of FIG. 2.

Regression approach is very effective if one knows the general format of a function that the observations would follow. Based on theoretical studies about building heat loads, a $3^{rd}$ order polynomial linear regression function is used to learn HVAC energy consumption model as described mathematically by $$Q_j = q(T_{j+1}^I, T_j^I, T_j^O, \beta) \quad j=1, \ldots, n \quad (8)$$

where $q(\cdot)$ is a 3rd order polynomial function of ($T_{j+1}^I, T_j^I, T_j^O$), n is the number of the observations saved in the each of the queues as shown in FIG. 2, $Q_j$ is the jth HVAC energy consumption observation, ($T_{j+1}^I, T_j^I, T_j^O$) is the predictor variable vector consisting of thermostat settings and indoor and outdoor temperatures related to observation $Q_j$, and $\beta = (\beta_1, \beta_1, \ldots, \beta_p)$ is the parameter vector, wherein p represents the total number of coefficients of the polynomial function. It is possible to add other inputs to the predictor variable vector to enhance the learning. Similar to the neural network approach, the regression model is updated daily when new data is saved in the queues each day. Compared to the simplified model Equation 5, the regression model can also provide more accurate estimation of HVAC energy consumption that is close to the actual results.

Similar to the neural network, the regression approach would provide a model that describes the relation of the HVAC energy consumption ($Q_i$) with the outside temperature ($T_i^O$), room temperature ($T_i^I$), and thermostat setting temperature ($T_{i+1}^I$) at a time frame i. This model is updated daily and is then used by the optimization module to determine an optimal next-day DR strategy to operate the HVAC for the next 24 hours given the predicted outside temperature)($T_i^O$) and electricity price.

Model Based Approach

As discussed above, the energy consumption model of the HVAC can be obtained by using a learning based approach, such as the neural network approach or regression based approach described above. In addition, the learning module may also model energy consumption by using a model-based approach. In the model based approach, the energy consumed by the HVAC $Q_i$ is modeled as a function of room temperature $T_i^I$, room temperature $T_{i+1}^I$ in hour i+1 (also represents the thermostat setting temperature in hour i), and outdoor temperature $T_i^O$. Equation 5 above shows an example of a simplified thermal model of a residential house. However, in reality, the relationship between indoor and outdoor temperatures and energy consumed by a HVAC unit is much more complicated than Equation 5 so that actual energy consumption of a HVAC unit could deviate greatly from results generated by using Equation 5, which would affect the DR efficiency.

Optimization Modules

The optimization modules generate DR strategies for one or more energy units having regulatable loads and/or fixed deferrable loads. In particular, the optimization module for creating DR strategies for regulatable loads may solve the optimization problem of Equation 4 to create a DR strategy for each regulatable energy unit to minimize the costs of energy consumption for a particular day. For example, the optimization module may use one of the following optimization approaches to solve the optimization problem: (1) a nonlinear or linear programming approach and 2) particle swarm technique. These are discussed in more detail below in relation to FIGS. 5A and 5B and Algorithms 1 and 2.

The optimization module for creating DR strategies for fixed deferrable loads may generate a DR strategy for each fixed deferrable load that may be based on real time energy pricing, acceptable price ranges, and/or time frames during which these energy consuming units may be operated. The energy usage of fixed deferrable loads is considered to have a fixed energy consumption pattern. The optimization module may use a binary integer programming technique to solve the optimization problem for fixed deferrable loads.

If assuming there are one HVAC load, one deferrable load, and one future fixed load, the robust integrative optimization can be described mathematically by Minimize: (9)
$$C = \sum_i (p_i - p_i^{PV} - p_i^{batt}) \cdot (Q_i^{HVAC} + Q_i^{deferrable} + Q_i^{fixed})$$

$i = 1, \ldots, 24$

Subject to: $0 \leq Q_i^{HVAC} \leq Q^{max}$, $T_{min} \leq T_{i+1}^I \leq T_{max}$, $Q_i^{HVAC} = q(T_{i+1}^I, T_i^I, T_i^O, \vec{w})$ $i = 1, \ldots, 24$ in which $p_i^{PV}$ and $p_i^{batt}$ are day-ahead dynamic discount price tariffs associated with PV and battery. The purpose of the discount price tariffs is to generate a virtual low price signal to home appliances so as to shift DR appliances to those "low price" time frames, such as during a high PV generation time period during day time or during a battery discharging time period after sunset. Similarly, computer-based learning systems may be configured for formulating dynamic discount price tariffs associated with PV power production and battery storage capability at different seasons, weather, and house conditions. Then, the next step is to solve the overall optimization problem to determine an optimal DR policy to operate the home appliances. Furthermore, the system may also generate a control and management strategy for the battery for the next day based at least on a charge of the battery for the current day and an expected, or modeled, difference between next-day energy generation from at least one renewable energy generation source and energy consumption from at least one energy consuming unit. The control and management strategy may include one or more time windows during which the battery is charged when energy generation is higher than energy demand or when energy from the battery is discharged for consumption by one or more energy consuming units when energy generation is not occurring or is occurring at a level below a predetermined acceptable threshold.

To solve the integrative optimization problem, many previous studies focused on developing methods to predict energy consumption patterns of all home appliances, including fixed deferrable and fixed non-deferrable loads, to manage the loads in the DR framework. However, due to various factors, the forecast data are far from accurate. Thus, most of these solutions used stochastic optimization techniques to solve the optimization problem. However, inventors discovered that knowing energy consumption patterns for fixed deferrable and fixed non-deferrable is not needed in optimization formulation. Instead, inventors have decoupled the complicated and multi-objective optimization problem into small, independent optimization sub-problems, which allows the optimization modules to generate DR policies for regulatable and fixed deferrable loads more effectively and efficiently.

In particular, in Equation 10 below, fixed loads are assumed to be future constant loads although it may not be known exactly how much electric energy a fixed load will use for the next day. This future fixed load concept may be applied to energy generated from renewable sources as well (such as solar PVs or wind turbines) except that the energy consumption from a renewable source is negative instead of positive. Hence, removing the fixed loads and fixed renewable sources from the objective function does not affect the optimal solution so that an equivalent and simpler optimization problem may be obtained, which is described by Minimize: $C = \sum_i (p_i - p_i^{PV} - p_i^{batt}) \cdot (Q_i^{HVAC} + Q_i^{deferrable})$ (10)

Subject to: $0 \leq Q_i^{HVAC} \leq Q_{max}$, $T_{min} \leq T_i^I \leq T_{max}$

Also, unlike the HVAC load, a fixed deferrable load has a fixed energy consumption pattern. This fixed load pattern can be applied to different time frames. Assuming that the fixed load pattern is $Q^{deferrable}$ within one-hour time frame, then Equation 10 can be simplified as $$\begin{cases} \text{Minimize: } C_{HVAC} = \sum_i (p_i - p_i^{PV} - p_i^{batt}) \cdot Q_i^{HVAC} \\ \text{Subject to: } 0 \leq Q_i^{HVAC} \leq Q^{max}, T^{min} \leq T_i \leq T^{max} \end{cases} \quad (11)$$

$$+$$

$$\left\{ \text{Minimize: } C_{deferrable} = \sum_i (p_i - p_i^{PV} - p_i^{batt}) \cdot \theta_i \cdot Q^{deferrable} \right.$$

where $\theta_i$ is a binary integer array to indicate the status of the deferrable load (e.g., on or off). For example, if the deferrable load is operated at ith hour of the day for one hour, then, $$\theta_i = (0 \; \ldots \; 0 \; \underset{ith \, hour}{1} \; 0 \; \ldots \; 0)^T.$$

Equation 11 indicates that the integrative optimization problem of Equation 10 is actually equivalent to two independent optimization problems. In summary, the optimization and energy management problem for fixed non-deferrable loads, regulatable loads, and fixed deferrable loads can be solved separately and then combined together to achieve the final optimal solution. Note that loads in each category are also independent. Therefore, a complicated and multi-objective optimization problem is decoupled into several small independent optimization problems that are used to generate robust optimal energy management policy and decisions effectively and efficiently. Energy consuming units having future fixed non-deferrable loads may be turned off via one or more sensors when not needed. For example, as shown in FIG. 20, lights in a room may be turned on in response to one or more sensors detecting the presence of a person in the room and turned off in response to one or more sensors detecting that the person has left the room (either via no input to that sensor or via input received by a sensor in another room).

The DR strategy for regulatable loads may be based on the modeled next-day energy consumption and day-ahead energy pricing. For example, for the HVAC unit, the optimization module uses the HVAC energy consumption model developed by the learning module to estimate HVAC energy consumption in each time window for the next day (e.g., 24 hours) and creates a DR strategy for the HVAC unit based on the modeled consumption, the weather forecast, and the next day energy prices. The DR strategy for the HVAC unit includes a plurality of thermostat settings corresponding to each time window for the next day that are the most cost-effective settings for the next day. Because the model is updated daily, an optimal and substantially real-time DR strategy that is solved according to the learning-based adaptive model results in more efficient operation of a HVAC unit for different seasons, users, and weather conditions. The optimization module may also be configured for adjusting the DR strategy for the current day based on RTP data for the current day. Initially, the queues used by the learning module do not contain sufficient amounts of data for the learning module to use a learning based approach to model energy consumption. Until the queues are sufficiently full, the optimization module may use an optimization approach based on a simplified energy consumption model, such as shown in Equation 5, and DAP data or a heuristic approach (see FIG. 1) and RTP data to generate a DR strategy for one or more energy consuming units.

For fixed deferrable loads, such as the dishwasher or dryer, the DR strategy may be based on real time energy pricing and acceptable price ranges and/or time frames during which the energy consuming unit may be operated. For these energy consuming units, the optimization module may receive from the customer an indication that the unit is operable when the RTP is lower than a predefined price set by the customer. This indication may be subject to operation during an acceptable time frame. Otherwise, those energy consuming units operate at the time frame that has the lowest price within a customer preferred time window. By delaying the operation of these energy consuming units, the total energy consumption of the house does not change. However, delaying operation to a non-peak or lower price time period may reduce the peak load and decrease the overall energy cost for the day, depending on the prices for the day.

For example, when DR strategies are not used, it may be assumed that the dishwasher operates between 7 pm to 8 pm and the dryer operates between 6 pm to 9 pm on Monday, Wednesday, and Friday. On Sunday, 50% usage of dishwasher and dryer is defined between 7 pm to 8 pm and 6 pm to 9 pm, respectively, for consideration of general light load usage of those appliances during the weekend.

Using a DR strategy, the customer may specify instead that the dishwasher may operate for an hour or less one time every two days, for example, but the customer may not have a preference as to when it is operated so long as the price of electricity during operation is within a particular range set by the customer. The operation schedule and/or preferred pricing ranges may be input by or at the direction of the customer, for example. In other implementations, the usage schedule may be set by another entity, such as the utility company, or set by the HEMS 10 based on DTP, RTP, energy generated by renewable sources associated with the house, and/or expected usage of other energy consuming units in the house.

Exemplary Flow of the HEMS 10

Figure 5A:
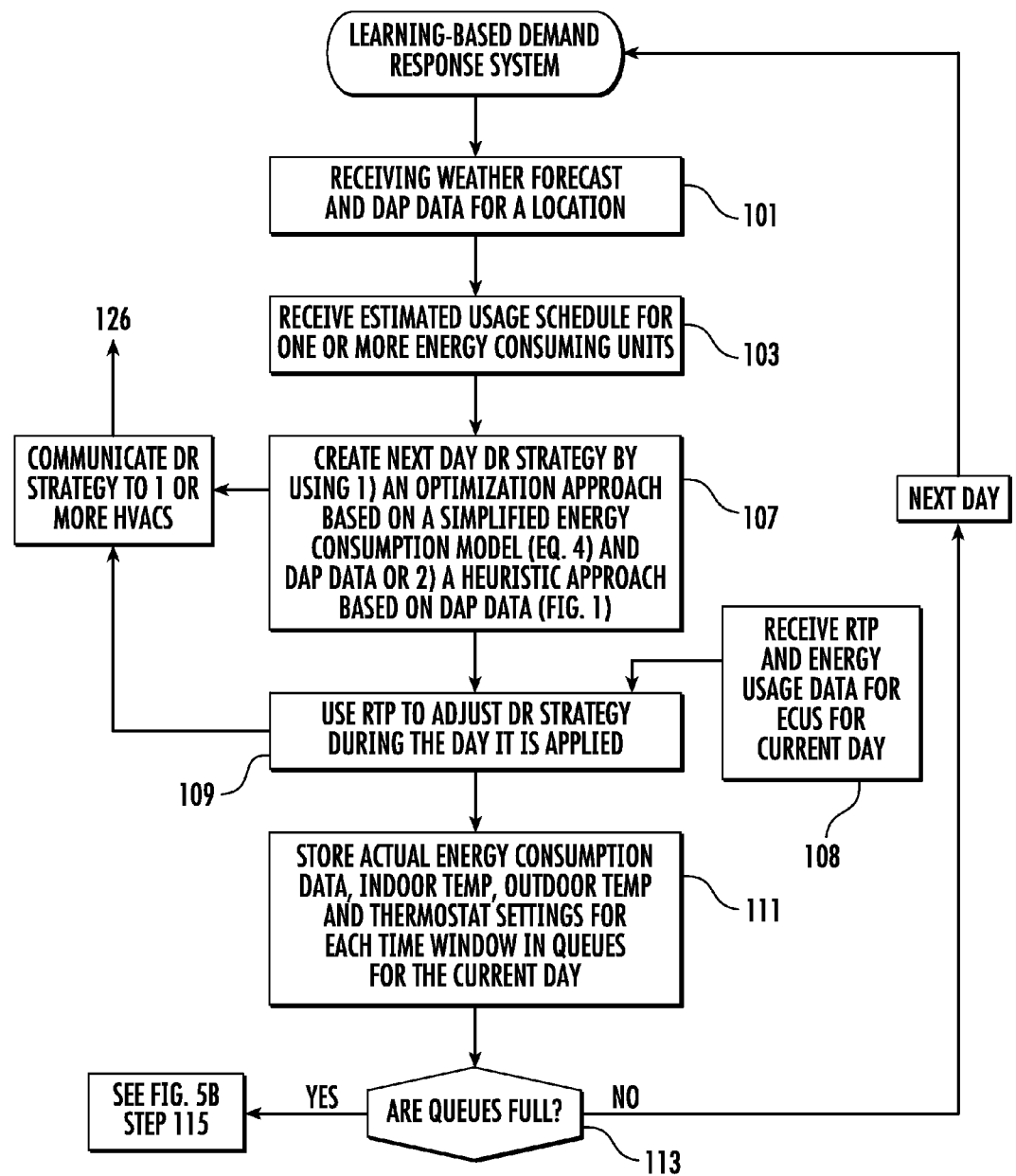
FIGS. 5A-5B illustrate a flow diagram of steps taken by various portions of the DR strategy system according to one implementation.
Figure 5B:
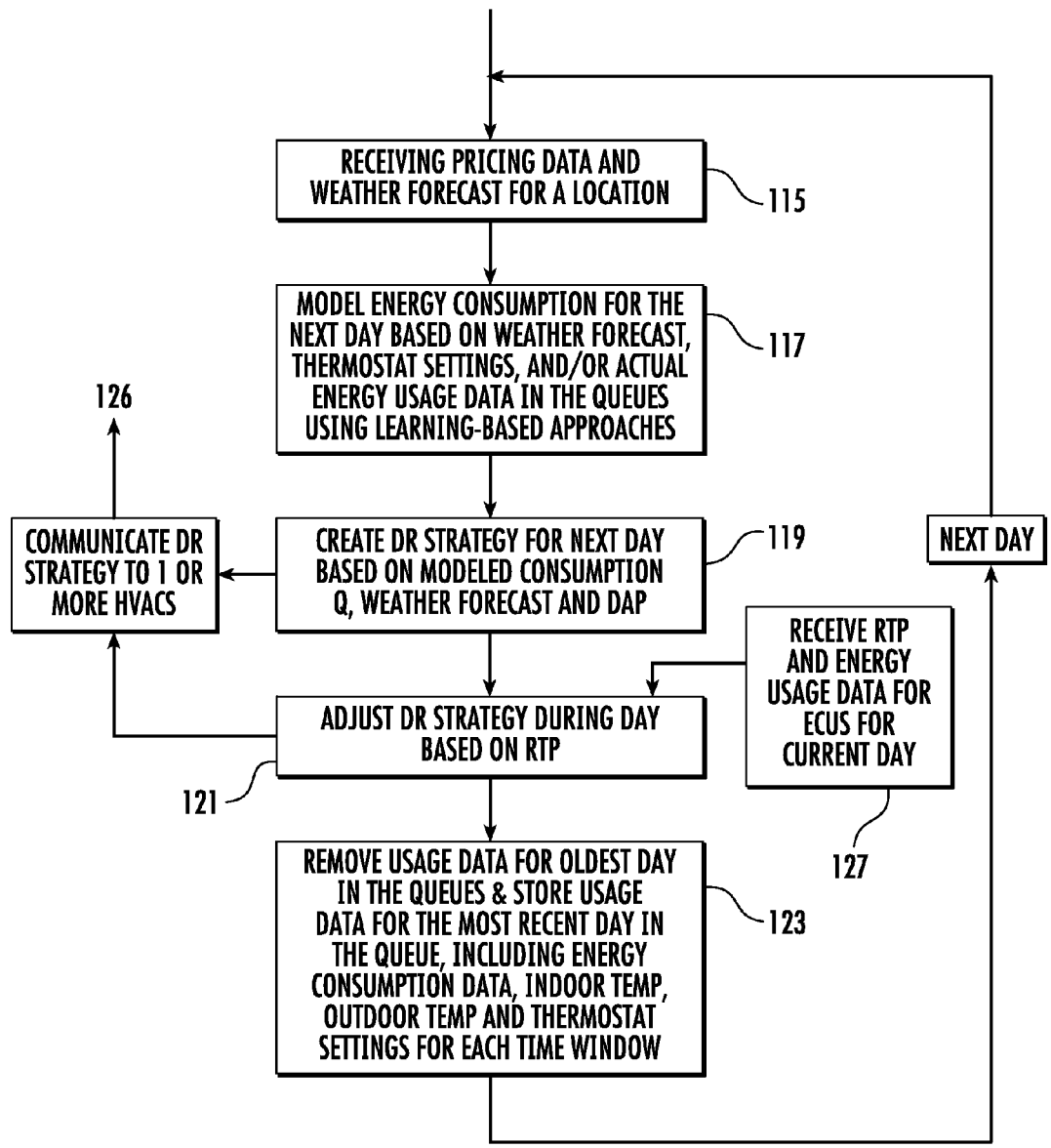

FIGS. 5A and 5B illustrate an exemplary flow 100 of the HEMS 10 for generating a DR strategy for an HVAC unit according to one implementation. If actual data is not available upon start up of the system 10, the system 10 establishes an initial DR strategy to use until sufficient initial data is collected and stored in the queues 26. Steps 101 through 113 below describe exemplary steps for establishing an initial DR strategy until sufficient amounts of actual measured data are available. The system 10 may use a simplified DR strategy, such as a heuristic DR method (FIG. 1), to run the HVAC unit until sufficient measured energy consumption data of the HVAC unit is stored in the queues 26. For a new home or HVAC unit, the data queues are empty at the beginning, so an optimization routine cannot be developed and applied. Thus, initial DR policies may be generated by using a simplified DR mechanism.

Steps 115 through 127 describe exemplary steps for establishing a more accurate DR strategy once sufficient data is stored. After the data queues 26 are full, the learning module learns the HVAC energy consumption model based on the measured energy consumption data stored in the queues 26, and the optimization module generates optimal DR policy everyday based on the learned model, weather forecast, and forecasted electricity pricing (DAP). The learning and optimization modules may be implemented via a substantially real-time computing system, such as digital signal processing (DSP) chips, by using assembly-language-based software.

Referring back to FIG. 5A, beginning at Step 101, DAP data and weather forecast for a location of the building are received by the system 50, such as by the communication module. For example, 24-hour electricity DAP data can be provided by an electric utility one day ahead under a dynamic pricing framework. The energy pricing data for electricity is typically provided by the electric utility company. Energy pricing data for natural gas is typically provided by the natural gas company. In addition, 24-hour weather forecast data may be available from National Weather Service, for example. The weather forecast data for the location may include 24-hour next-day weather forecast data and current-day weather data, such as predicted and current hourly temperatures, humidity, and wind speed and direction.

In Step 103, an estimated usage schedule for the HVAC unit is received. The estimated usage schedule includes, for example, when and for how long the HVAC is operated and how much energy is needed to operate it. For example, the HVAC unit may be operated throughout the day depending on the indoor temperature, and the length of time for operation and the amount of energy needed for operation depends on the outdoor temperature, the thermal characteristics of the house, and the efficiency of the HVAC unit.

A next-day DR strategy is created in Step 107 by using a simplified DR technique, such as 1) an optimal HVAC DR policy generated based on the simplified energy consumption model (Equation 5) and DAP data or 2) an HVAC DR policy generated by using a heuristic approach based on DAP data (FIG. 1). The next-day DR strategy sets forth the operating parameters of one or more energy consuming units at different times of the day. For example, the DR strategy may set forth the hourly thermostat settings for the HVAC system and time frames for operation of the dishwasher, washer, and/or dryer.

Referring back to the implementation shown in FIG. 5A, if RTP data is available for the location, the RTP data may be received in Step 108, and the heuristic approach or the simplified optimization approach may be used with the next-day DR strategy and RTP data to adjust the DR strategy during the current day in which the DR strategy is applied to optimize the energy costs for the customer, as shown in Step 109. This step may be omitted, however. For example, Steps 108 and 109 may be omitted if RTP data is not available for the location or if there are other incentives given to customers by the utility company. In an alternative implementation (not shown), the RTP data may be used to evaluate the effectiveness of the DR strategy for the current day in addition to or in lieu of Step 109. Actual energy consumption data, indoor temperatures, outdoor temperatures, and thermostat settings for each time window (e.g., each hour or preset time frame) during a day are stored in the memory in respective queues 26, as shown in Step 111, by the data management module. The data is stored in each queue on a FIFO basis for a certain number of days n. For example, in one implementation, the data may be stored for 8 days. Thus, when new data is received each day, the oldest data saved in the front of the queues is removed and the new data is saved. Maintaining the queue on a FIFO basis provides up-to-date household energy consumption data for the learning module, which allows the learning module to more accurately capture the thermal and appliance energy usage behavior of a house for different seasons, users, and weather conditions, for example. The number of days for which the queues are configured for storing data may be selected such that any update of the HVAC energy consumption based on the data saved in the queues should reflect the impact of the seasons, weather, users, and house conditions, for example, within one or two weeks.

The system repeats Steps 101 through 111 until the memory queues 26 are full, as shown in Step 113. Alternatively, if a data acquisition or storage component of the system 10 has a problem that prevents storage of data for one or more days into the queues 26, Steps 101 through 113 may be executed until the model is stabilized (e.g., the queues 26 are fully populated by data that can be used by the learning module).

Once the memory queues 26 are full, DAP data and weather forecast data for the location are received in Step 115, such as by the communication module. Then, in Step 117, the learning module models the energy consumption for the next day using a learning-based approach, such as neural network learning or regression-based learning, which are described above in the section entitled "Learning Module." The modeled energy consumption is based on the weather forecast data and actual usage data stored in the memory queues 26, for example. In one implementation (not shown), the learning module may be configured for receiving a selection from the user regarding which learning based approach the user prefers for the system 10 to use. In another implementation (not shown), the user may be able to select a particular learning based approach for the system 10 prior to or during installation of the system 10.

In Step 119, a DR strategy is created for the next day by the optimization module based on the energy consumption modeled in Step 117 and the DAP data received in Step 115. This DR strategy is communicated to the HVAC unit in Step 126 by the communication module.

In Step 127, RTP data and energy usage data for the current day may be received by the communication module, and in Step 121, the DR strategy that was created the day prior for the current day may be adjusted during the current day based on the usage data and/or RTP data received for the current day. However, if RTP data is not available for the location or if there are other incentives given to customers by the utility company, these steps may be omitted.

In Step 123, the data management module removes usage data from the queues for the oldest day and stores usage data for the most recent day (e.g., the current day or one day prior) in the queues. Then, Steps 115 through 127 are repeated for the next day.

The various modules described above in FIGS. 4 and 5A-5B are exemplary and the functions described as being performed by each module may be performed by other modules executed on the same or another computing device.

Except for the queues, it is possible to use other data structures, such as trees, tables, or database management systems, to store the weather and usage data.

FIGS. 5A and 5B illustrate an exemplary process for generating a DR strategy for the HVAC unit, but the process and data described above may be adapted for other types of regulatable energy units.

Algorithm 1 below presents an exemplary pseudo-code that illustrates how an HVAC energy consumption model is learned and how an optimal DR policy for operating the HVAC unit is generated and updated. Lines 1 to 8 correspond to Steps 101 through 113 of FIG. 5A for establishing an initial DR strategy until sufficient amounts of actual data are available.

Lines 9 and 10 correspond to Steps 115 through 127 of FIG. 5B for establishing a more accurate DR strategy once sufficient data is stored. A HVAC energy consumption model for the time window represented by the length of the queues is obtained through the regression or neural network approach, based on which an optimal DR policy is generated (line 10). The DR policy is loaded into a programmable thermostat to control HVAC energy consumption for the next day. During the operation of the HVAC unit the next day, the actual measured energy consumption results, together with the actual measured weather information, 24-hour thermostat settings and actual measured 24-hour indoor room temperature, are saved in the queues. At the same time, old 24-hour data in the front of the queues are removed. The process continues to update HVAC energy consumption model and generate new optimal DR policy day after day.

---
Algorithm 1: Learning-based demand response
---
1: {Initial demand response Steps 101 through 113as shown in FIG. 5A}
2: for d=1 to numDay
3:     $T_{queue}^O \leftarrow T_i^O$, $P_{queue} \leftarrow P_i$ (i=1,......, 24)
4:     Obtain 24-hour thermostat setting $T_i$(i=1, ..., 24) (Step 107 as shown by Fig. 5A).
5:     Programmable thermostat $\Leftarrow T_i$(i=1, ..., 24).
6:     Obtain next-day HVAC energy consumption $Q_i$(i=1, ..., 24) through real-time measurement
7:     $Q_{queue} \leftarrow Q_i$, $T_{queue} \leftarrow T_i$(i=1, ..., 24)
8: end for
9: {Updating HVAC energy consumption model and generating optimal DR policy (Steps 115 through 127 as shown by FIG. 5B) using nonlinear programming or PSO method (see discussion of optimization module below) }
10: Running algorithm day after day (go back to line 9).
---

Algorithm 2 shown below provides the pseudo-code of the particle swarm optimization (PSO) method according to one implementation. In PSO, each single solution is called a particle in the search space. All of particles have fitness values which are evaluated by the fitness function to be optimized, and have velocities which direct the flying of the particles. Each candidate solution can be thought of as a particle "flying" through the fitness space by updating the candidate velocity and position based on both global best fitness position and local best fitness position.

---
Algorithm 2: PSO during the iteration of Alg. 1 in line 9
---
1: Initialize particle position: $T_{buf}(m) \in [T^{min}, T^{max}]$
2: Initialize particle speed:
    $\tilde{T}_{buf}(m) \in [-\Delta T, \Delta T]$, m=1,...,M
3: {Calculate initial fitness values for all particles} fitness(m)=f($T_{buf}(m)$), m = 1,...,M
4: $\hat{T}_G \leftarrow T(k)$; if fitness(k)=max{fitness(m),m$\in$ [1, M]} $\hat{T}(m) \leftarrow T(m)$;
5: do
6:     {Update velocity for all particles}
        $\tilde{T}(m) = w\tilde{T}_{buf}(m) + c_1 \cdot rand(0,1)[\hat{T}(m)-T_{buf}(m)]$
        $+c_2 \cdot rand(0,1)[\hat{T}_G-T_{buf}(m)]$
7:     {Update position for all particles}
        $T(m) = T_{buf}(m) + \tilde{T}(m)$
8:     if T(m) out of boundary $\rightarrow$ boundary handling T(m)
9:     {Calculate fitness values for all particles} fitness(m)=f (T(m)), m = 1,... ,M
10:     $\hat{T}_G \leftarrow T(k)$; if fitness(k)=max{fitness(m), m $\in$ [1,M]} $\hat{T}(m) \leftarrow T(m)$; if $T(m) > T_{buf}(m)$
11:     $T_{buf}(m) \leftarrow T(m)$; $\tilde{T}_{buf}(m) \leftarrow \tilde{T}(m)$
12: while maximum iterations or a stop criteria is not reached
13: Output global optimal solution $\hat{T}_G$ to Alg. 1.
---

In Alg. 2, T(m), the position of a particle, represents a 24-hour thermostat setting during a day. $\tilde{T}(m)$, the speed of a particle, represents the thermostat adjustment during one iteration of the PSO algorithm. $\hat{T}(m)$ and $\hat{T}_G$ are the individual best thermostat setting associated with particle m and the global best thermostat setting of all the particles, respectively. In line 6, $c_1$ and $c_2$ are the user defined coefficients, and w is the inertia weight used to balance global and local search. These parameters are determined through trial and error until a best possible result is obtained. For each updated particle position calculated in line 7, it is checked in line 8 whether the updated position is out of the boundary. If so, for any temperature setting beyond $[T^{min}, T^{max}]$ it is reset to $T^{min}$ or $T^{max}$ depending on whether the temperature setting is smaller than $T^{min}$ or larger than $T^{max}$ [40]. The fitness function $f(\cdot)$ is defined by $$f(T_m) = \begin{cases} 1 / \left[ \sum_{i=1}^{24} p_i \cdot Q(m)_i \right], & Q^{min} \leq Q(m)_i \leq Q^{max} \\ 0 & \text{else} \end{cases} \quad (12)$$

where $Q(m)_i = q(T_{i+1}, T_i, T_i^O, \beta)$ is the energy consumption of the HVAC for particle m at ith hour (i=1, ..., 24), and $Q^{min}$ and $Q^{max}$ stand for the minimum and maximum HVAC energy consumption corresponding to a practical HVAC unit.

The global market for grid-connected residential solar PV installations coupled with energy storage is predicted to grow tenfold to reach more than 900 megawatts in 2018, making smart management and control of residential PV systems and energy storage increasingly important. To electric utilities, proper management of PV and energy storage will help to maintain grid reliability, resiliency, and power quality while minimizing curtailment of available solar power. To home owners, effective use of PV and energy storage will help consumers to save money off the electricity bill. Residential PV and energy storage that is managed and controlled holistically according to dynamic electricity prices and tariffs in a demand response (DR) framework may benefit the utility company and residents. Based on this framework, the HEMS provides the most efficient and cost effective grid integration of residential energy storage, solar PVs, and home appliances, according to various implementations.

Figure 16:
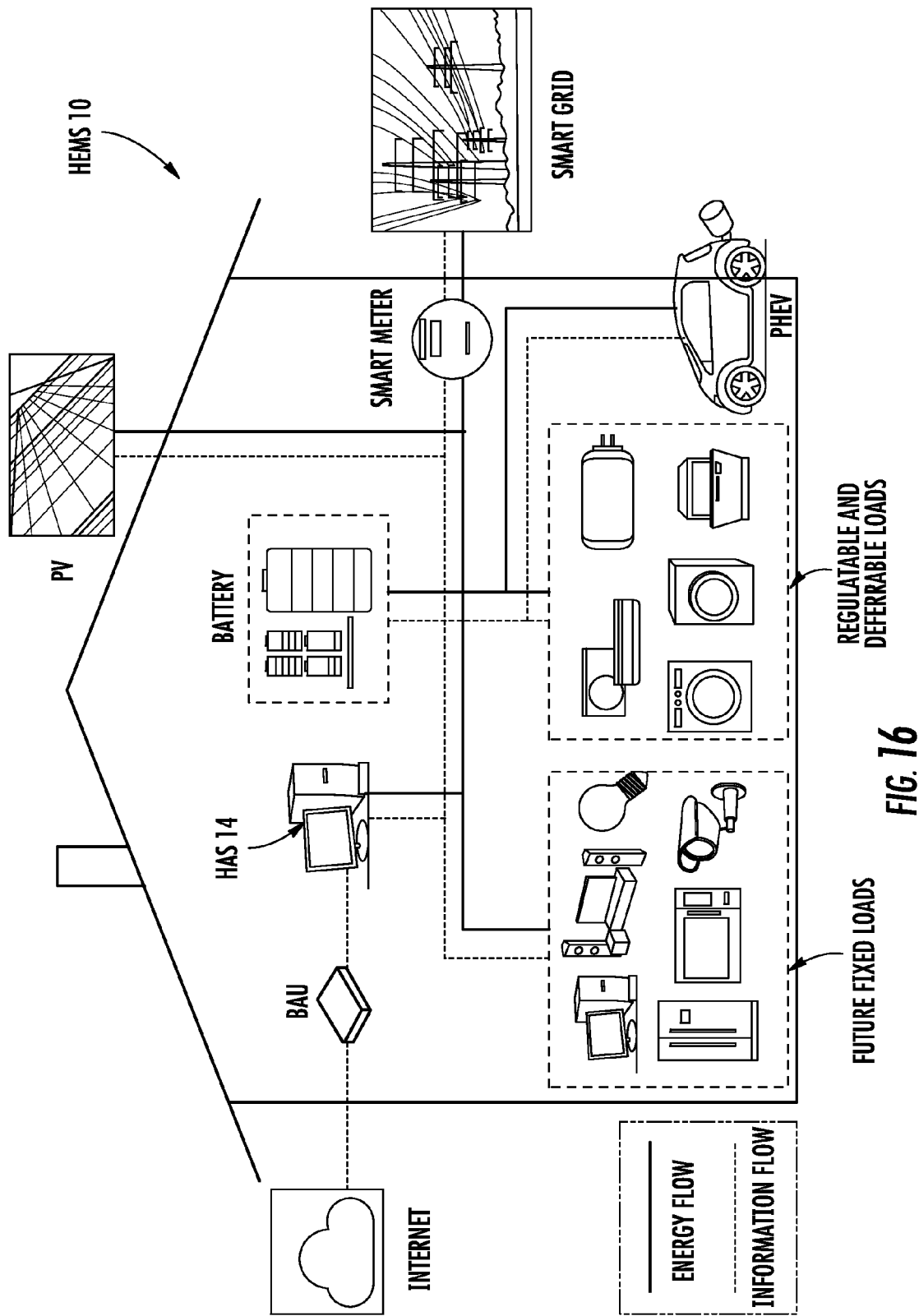
FIG. 16 is a schematic diagram illustrating the flow of energy and information among various energy consuming and generating units and a home energy management system according to one implementation.
Figure 17:
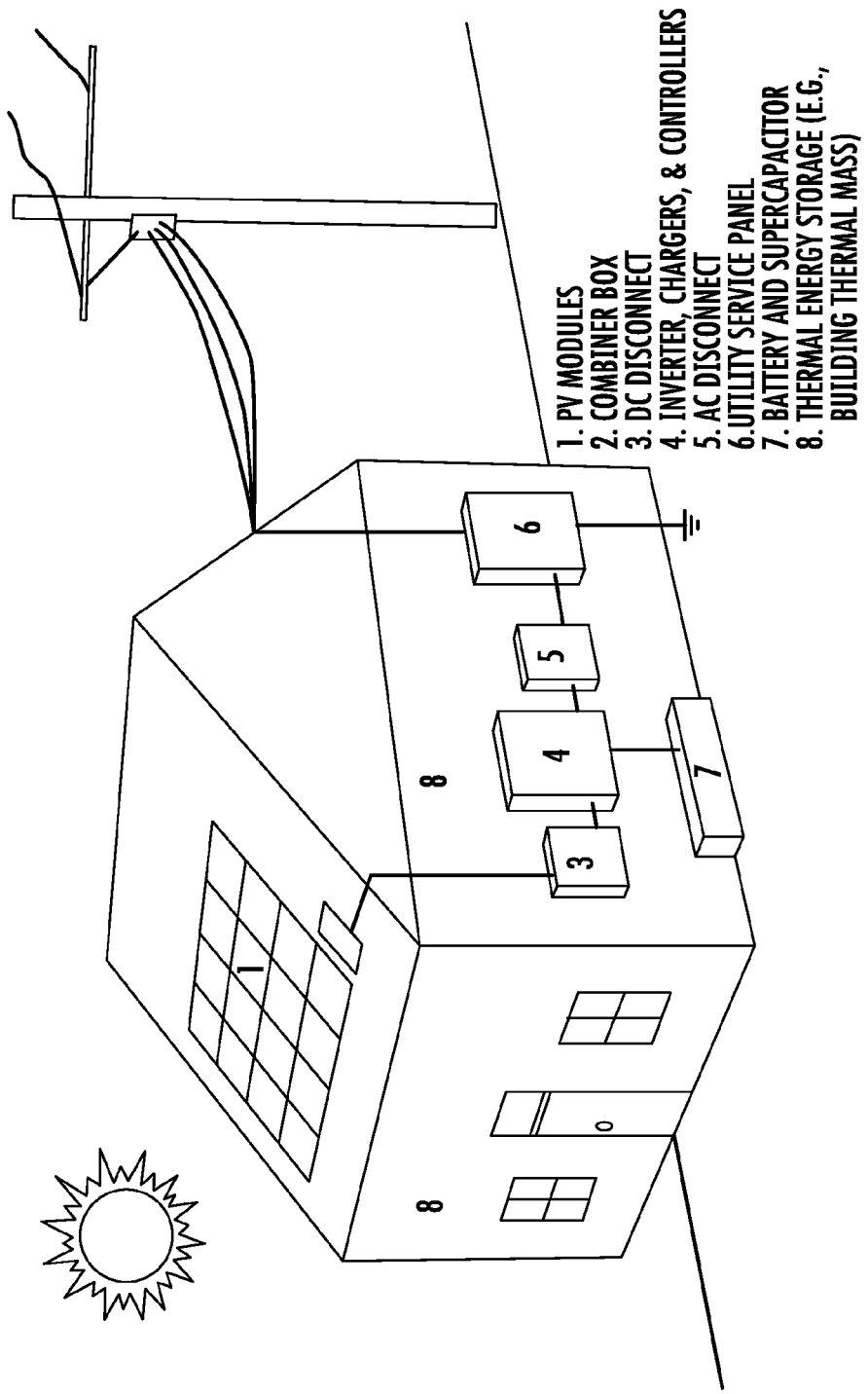
FIG. 17 is a schematic diagram illustrating several components of a solar energy system for a building, according to one implementation.

For example, FIGS. 16 and 17 illustrate diagrams of a residence in which solar PVs, home appliances, and residential energy storage are integrated into the HEMS 10. In particular, the HEMS 10 according to the implementation shown in FIG. 17 further includes an inverter 4, a battery 7 for storing energy generated by the PV system 1 and discharging energy to energy consuming units within the building, a supercapacitor in electrical communication with the battery 7 that absorbs most of the large and fast ramps in PV power output (e.g., caused by cloud movement). The PV system 1 may be configured for operating in maximum power point tracking (MPPT) mode, according to one implementation. The HAS 14, or another controller in electrical communication with the HEMS 10, may be further configured for: (1) using artificial neural networks (ANNs) and adaptive dynamic programming (ADP) to control the inverter 4, (2) identifying when power should be released or stored by the battery by integrating real-time dynamic impedance measurements for battery charging/discharging algorithms, and (4) coordinating usage of regulatable and deferrable energy consuming units with PV and energy storage.

Security System for HEMS

Various implementations of the HEMS 10 may also include a security system that assures that DR policies generated one day or hours ahead are executed next day or later without modification. The security system may communicate with a smart meter that is configured for proving the correctness of any smart appliance, a group of smart appliances that are configured for proving the correctness of the smart meter, and a service provider configured for proving the correctness of the smart meter. In one exemplary security system, each meter has a copy of its own log, and each household meter is mapped to several other witnesses. The system also includes a commitment protocol that is used to ensure that witnesses will retrieve exactly the same log as the observation object owns. In addition, the system includes a challenge/response protocol to address the problem that some household meters do not response or fail to acknowledge whether messages were sent successfully or not.

The security system maintains the confidentiality, availability, and integrity of information and systems and methods of implementing the above-described functionality and other smart home functions. In addition, accountability mechanisms may be also be included that provide trustworthy smart appliances in homes and overcome the challenges for integration of physical systems and human factors. Thus, the security system may be configured for (1) accountable, non-repudiable, malicious appliance inspection, (2) denial of service (DoS) attack mitigation for operation of diverse DR appliances and renewable sources in the smart home area, and (3) interoperability of energy system, wireless communication, and security methods.

The accountability mechanisms may be configured for verifying the customer responses and the smart appliance group and for adopting logic to provide theoretical proofs of accountability for the designed protocols. The security mechanisms and protocols may also allow a utility company to prove the correctness of DR policies actually used to operate home appliances.

The designed protocols may achieve the following exemplary goals: (a) a smart meter that can prove the correctness of smart appliances in a home; (b) a group of smart appliances that can prove the correctness of the smart meter; and (c) a service provider that can prove the correctness of the smart meter. The witness mechanisms may include several protocols. For example, one protocol may be that every meter has one copy of its own log, which is ensured by a tamper-evident, log mechanism. Other logs are retrieved when required. Meters exchange just enough messages to prove themselves. As another example, each household meter is mapped to several other witnesses. Each witness collects its log, check its correctness by comparing the readings, and reports the results to the rest of the system. The witnesses are reassigned observation objects according to function w at set intervals. Another example includes a commitment protocol that is used to ensure that witnesses will retrieve exactly the same log, as the observation object owns. It also guarantees that no one can deny a received message. Furthermore, another example includes a challenge/response protocol to address the problem that some household meters do not respond or fail to acknowledge whether messages were successfully sent or not.

Mutual-inspection and malicious appliance inspection mechanisms may also be included. Mutual-inspection mechanisms may realize non-repudiation in smart homes so that any misbehavior and malicious operation compromising power reading is eventually detected either by the utility company or by independent users. The system may also jamming mitigation techniques, sampling synchronization, and how to prevent wireless network delay and wireless jamming. The malicious appliance inspection problem may be addressed via a suite of tree-based inspection algorithms (including an adaptive tree approach) for both static inspection and dynamic inspection, which are investigated through theoretical analysis, simulations, and experiments.

Second, to prevent the HEMS wireless networks from being jammed maliciously to cause DoS attacks, the security system may include DoS attack mitigation methods for diverse DR appliances and renewable sources in the smart home area. For example, these methods may include channel hopping when a DoS attack happens, such as rendezvous channel hopping algorithms via catalan number series, as channel hopping patterns with adjustments.

Third, interoperability and security are tightly coupled activities, and these joint activities satisfy multiple requirements in both domains, including interoperability requirements for transparency and clarity in system interfaces and relationships, and security requirements for resistance to attack, self-checking, system access control, etc.

Computational Experiment System for Comparing DR Strategies Based on Various Energy Consumption Models A great difficulty for DR study is how to investigate and evaluate the performance of different DR strategies because such study requires the DR strategies to be applied to the same house condition. For a practical residential house, it is impractical to meet this requirement.

Figure 7:
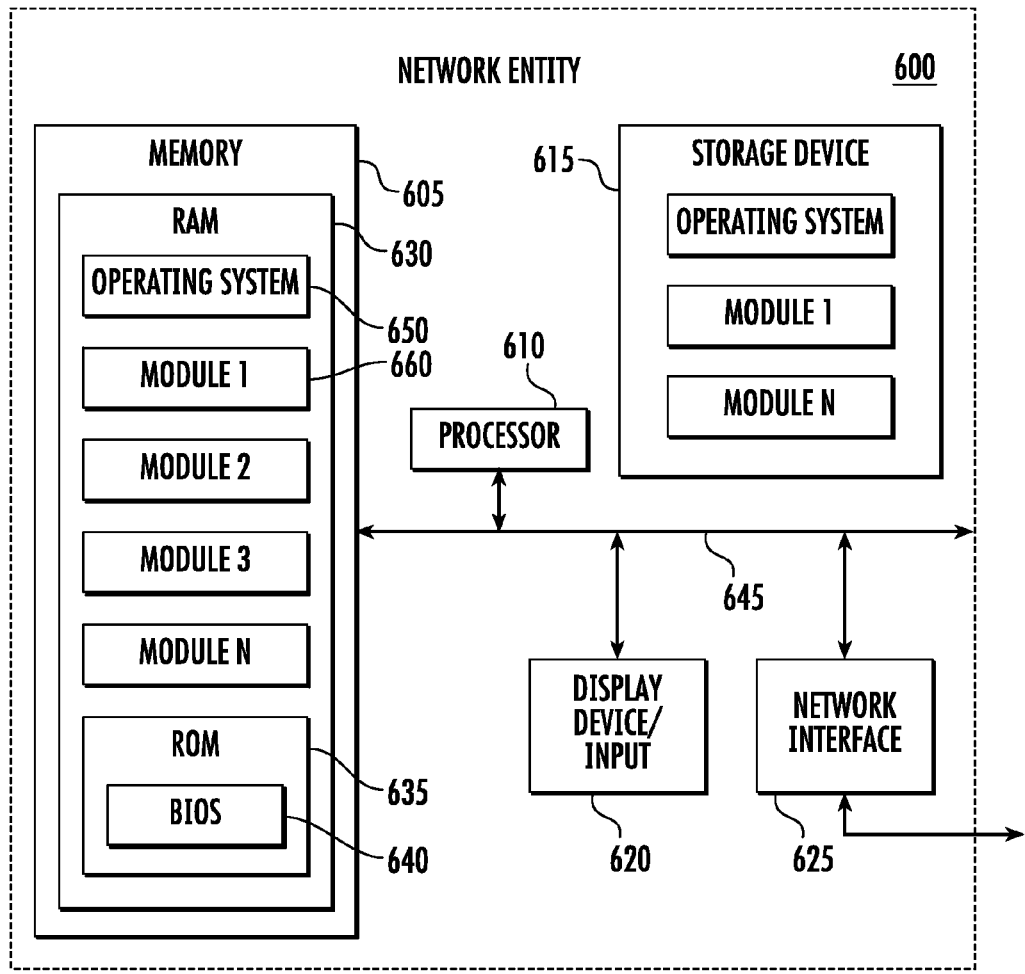
FIG. 7 illustrates a schematic diagram of an exemplary central server configured to implement at least a portion of a computational experiment system according to one implementation.
Figure 9:
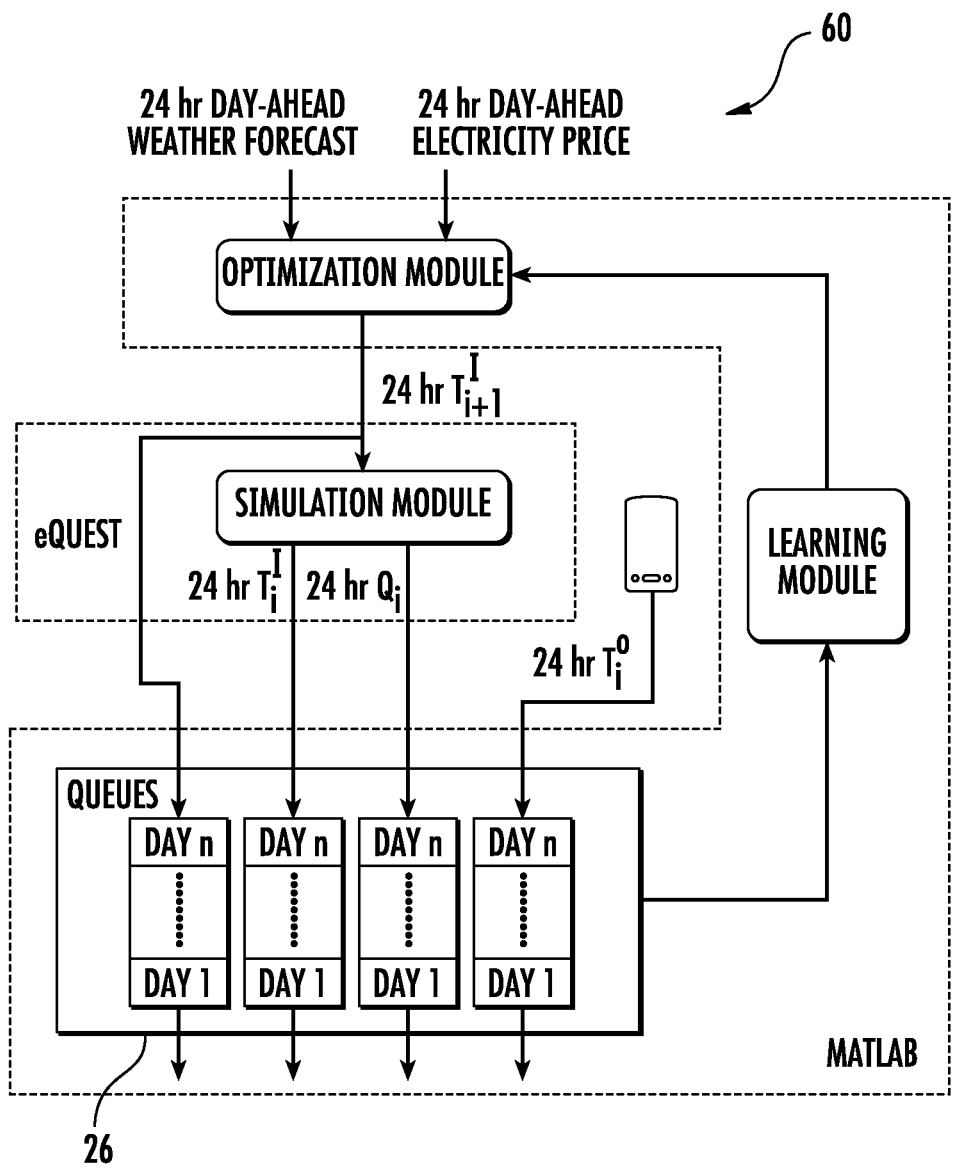
FIG. 9 illustrates a schematic diagram of a computational experiment system according to one implementation.

DR strategies developed using various learning-based modeling approaches may be compared, researched, and evaluated by using a computational experiment system that simulates energy consumption of a real-life house. This section describes an exemplary computational experiment system for comparing DR strategies based on various energy consumption models. The computational experiment system 60 shown in FIGS. 7 and 9 is similar to the real-life DR strategy system 10 described above in relation to FIGS. 2-5B except that the system 60 uses simulated energy consumption data generated by building simulation software instead of actual energy consumption data, according to various implementations. In addition, the system 60 may generate multiple DR strategies based on various energy consumption modeling approaches so that the cost and energy effectiveness of the multiple DR strategies may be compared. In one implementation, this system 60 may provide information to the end user comparing the energy costs and/or consumption resulting from use of the DR strategy system 10 and the costs and consumption resulting from another type of DR system or from not using a DR strategy.

To accomplish the computational experiment system, MATLAB, a powerful technical software system, is integrated with building simulation software for the DR evaluation, according to one implementation. The integrated simulation strategy may greatly accelerate the offline design and assessment of a DR strategy. Other suitable software can also be used for such offline simulation evaluation.

The building simulation software, such as eQUEST, Energy Plus and others, is used as a virtual test bed to simulate home energy consumption. The building simulation software allows one to "build" a simulated house that is similar to a practical one. It uses standard commercial building materials defined in the software library and real-life weather and solar data, which may be obtained from the US Department of Energy, for example. Thus, the building simulation software is capable of estimating changes in the electrical load of a "practical" house throughout a year, certain days within the year, or certain time period of a day.

To simulate energy consumption of a residential house, an architectural model of the house is created based on the blueprint and construction materials used to build the house.

For example, a generic floor plan for a two story, 2,500 square foot house may be used with a location selection of Springfield, Ill. Next, internal loads are defined. The internal loads may include, for example, washing machines, dryer, water heater, dishwasher, electric stove, refrigerator, microwave oven, lights for each room, occupants, etc. Then, appropriate schedules are input to model these loads, such as when, how long, and how much of these loads are used each day. The final step is defining the HVAC system. In this example, a three-ton unit is selected to condition the first floor and a two-ton unit is selected to condition the second floor. Additional details about how to build a simulated house can be found in the *eQuest Introductory Tutorial*, version 3.64 by James J. Hirsch & Associates, December 2010, for example. The simulation software uses the above information to simulate the amount of energy consumed during various time windows of a day (e.g., hourly) based on the actual weather data for that day for the specified location.

Figure 8A:
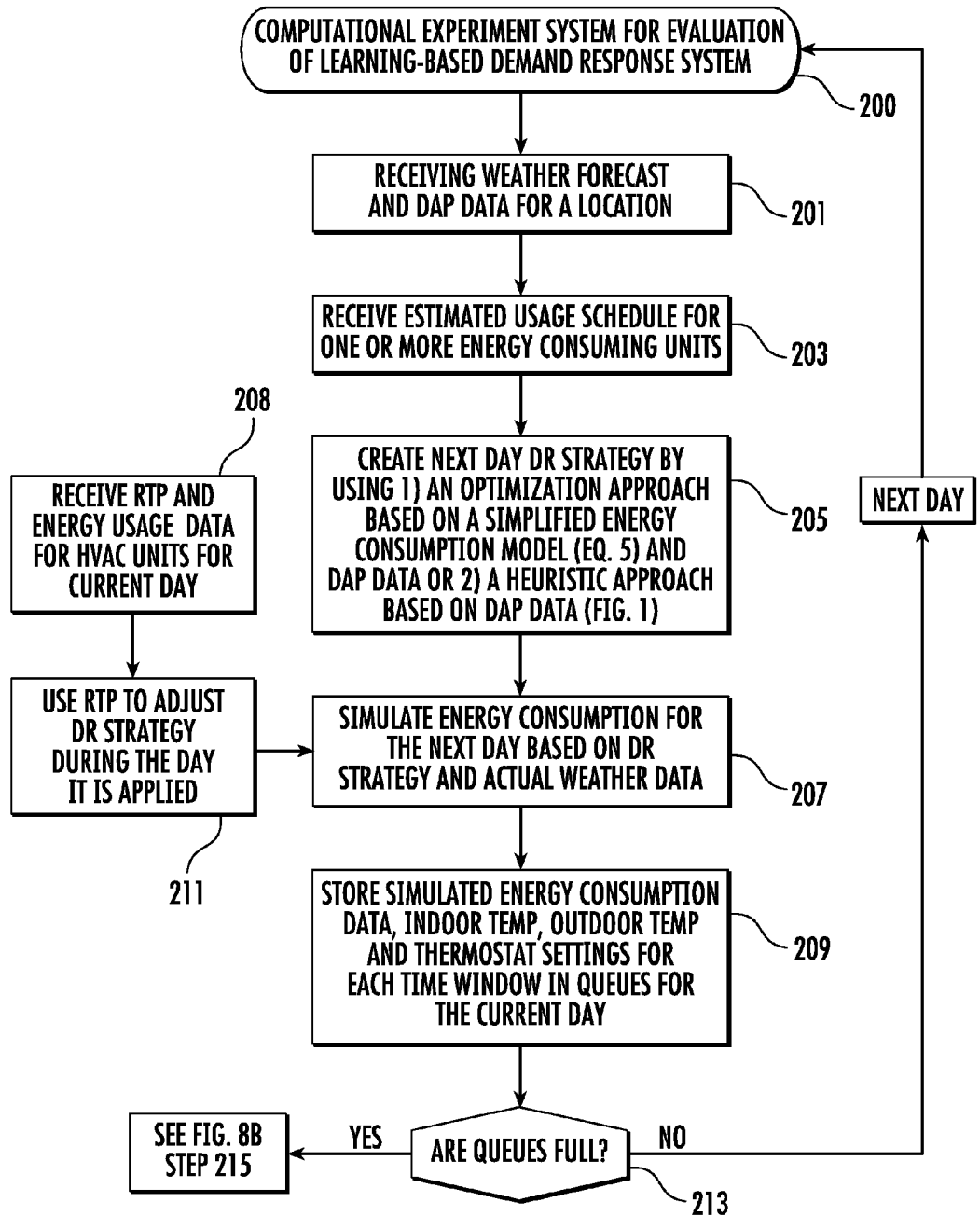
FIGS. 8A-8B illustrate a flow diagram of steps taken by various portions of the computational experiment system according to one implementation.

FIG. 7 illustrates a schematic diagram of a central server 600 for implementing a computational experiment system 60 according to one implementation, and FIGS. 8A-9 illustrate an exemplary flow for the system 60 according to one implementation.

As shown in FIG. 7, the central server 600 may include a processor 610 that communicates with other elements within the central server 600 via a system interface or bus 645. Also included in the central server 600 may be a display device/input device 620 for receiving and displaying data. This display device/input device 620 may be, for example, a keyboard or pointing device that is used in combination with a monitor. The central server 600 may further include memory 605, which may include both read only memory (ROM) 635 and random access memory (RAM) 630. The server's ROM 635 may be used to store a basic input/output system 640 (BIOS), containing the basic routines that help to transfer information across the one or more networks.

In addition, the central server 600 may include at least one storage device 615, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 615 may be connected to the system bus 645 by an appropriate interface. The storage devices 615 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 630. Such program modules may include an operating system 650 and a plurality of one or more (N) modules 660. The modules 660 may control certain aspects of the operation of the central server 600, with the assistance of the processor 610 and the operating system 650. For example, the modules may perform the same or similar functions described above in relation to FIGS. 4 and 5A-5B and below in relation to FIGS. 8A-8B and illustrated by the figures and other materials disclosed herein, such as executing various functions of the computational experiment system 60.

In one exemplary implementation, the server 600 includes the following modules: a simulation module, a learning module, an optimization module, a data management module, and a pricing module.

The simulation module uses the next-day DR strategy determined the day before by the optimization module for the system 60 and current day weather data to simulate the energy consumption of the house for the current day. In particular, energy consumption of a residential house is simulated by using the simulation module of the computational experiment system 60 for a practical weather pattern of the day, including temperature, humidity, solar radiation, etc., at a location. The results generated by the simulation module of system 60 are stored in the queues and are received by the learning module of system 60 to update the modeled energy consumption each day.

The learning, optimization, and data management modules of the computational experiment system 60 are similar to the corresponding modules described above for the DR strategy system 10, except that the queues include simulated energy consumption data generated by the simulation module instead of actual energy consumption data. FIG. 9 illustrates the schematic flow of data through the queues and the learning, optimization, and simulation modules of the system 60.

The pricing module calculates electricity pricing for the current day based on RTP data and the simulated energy consumption for the house. The pricing module may also calculate energy pricing for the next day based on DAP data and the simulated energy consumption for the next day. For an implementation in which two or more learning approaches are used to model the energy consumption of the house and a DR strategy is determined based on each learning approach, the pricing module may generate one or more displays indicating the calculated prices for energy usage over the course of a day using each DR strategy, such as the graphs shown in FIGS. 11-15.

Figure 8B:
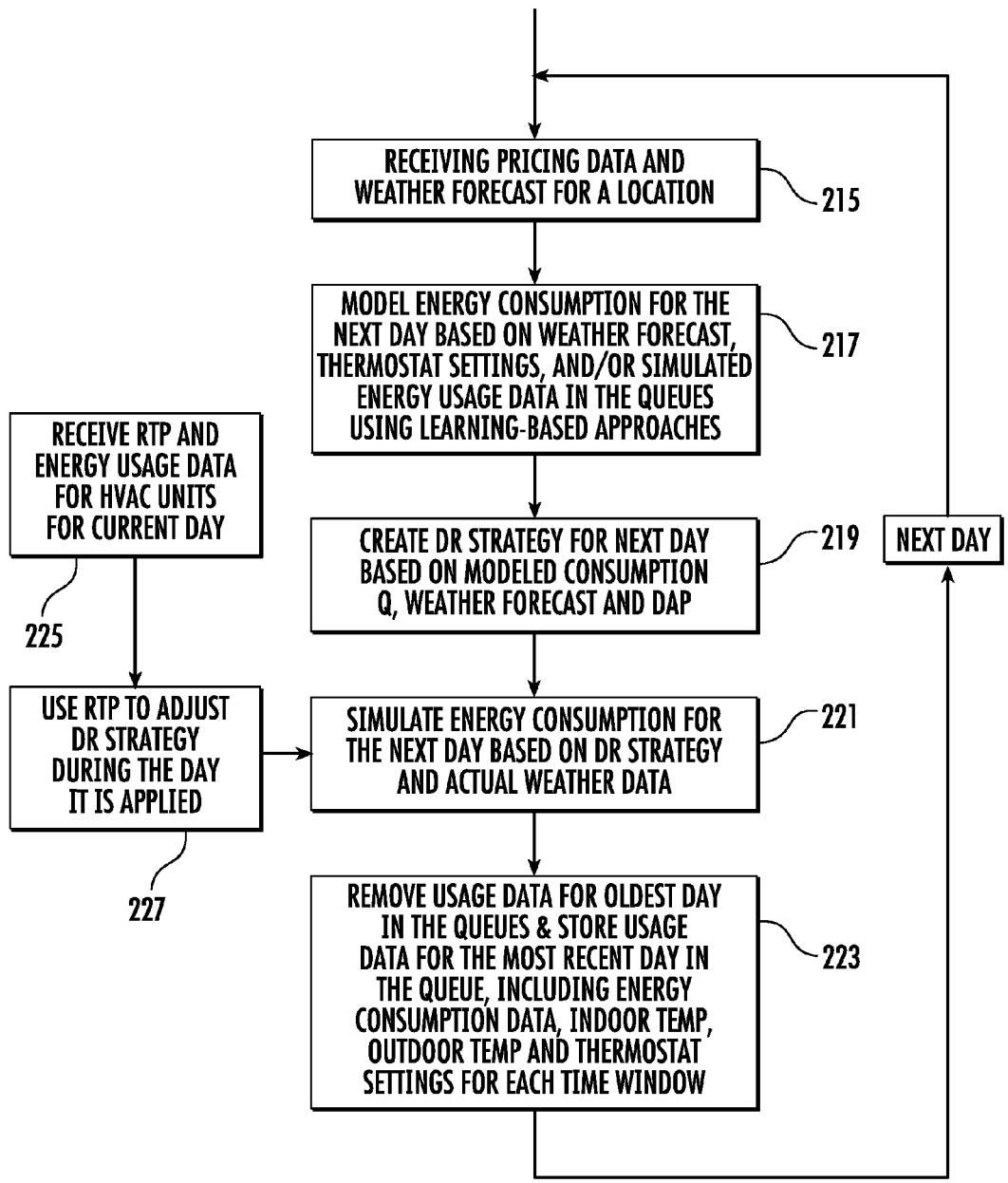

FIGS. 8A-8B illustrate an exemplary flow 200 of the computational experiment system 60 according to one implementation. Beginning at Step 201 in FIG. 8A, the DAP pricing data and weather forecast data are received for a particular location. In Step 203, the estimated usage schedule for an HVAC unit for the house for the next day is received. In Step 205, a next-day DR strategy is created by the optimization module by using a simplified DR technique, such as (1) the optimal HVAC DR approach based on the simplified energy consumption model shown in Equation 5 and DAP data or (2) a heuristic approach based on DAP data (FIG. 1). Then, in Step 207, the DR strategy is communicated to the simulation module to simulate energy consumption for the next day based on the DR strategy and actual weather for that day. If RTP data is available for the location, the RTP data and the simulated energy usage for the HVAC unit may be received for the current day, as shown in Step 208, and the RTP is used to adjust the DR strategy during the day it is being applied, as shown in Step 211.

In Step 209, the simulated energy consumption data, the thermostat settings, and the temperature data (indoor and outdoor) for each time window for the current day are stored in the memory queues.

In Step 213, the system 60 determines whether the queues are full. If the queues are not full, then Steps 201 through 211 are repeated for the next day. If the queues are full, then the system 60 proceeds to Step 215 in FIG. 8B in which DAP and weather forecast data are received for the next day. In Step 217, the learning module generates at least one energy consumption model for the HVAC unit using one or more learning-based approaches based on the weather forecast, thermostat settings, and the simulated energy consumption data stored in the queues. In Step 219, the optimization module generates one or more DR strategies based on the DAP, the weather forecast, and the one or more energy consumption models from Step 217. The DR strategies may be based on the same modeling approach or different modeling approaches. Alternatively, or in addition thereto, the DR strategies may be solved using the heuristic approach, the optimal approach from Equation 5 or Equation 8, or the PSO approach using Equation 4 or Equation 8. In Step 221, the DR strategies are communicated to the simulation module to simulate energy consumption for the next day based on the actual weather. In Step 223, the simulated energy data from the simulation module is communicated to the data management module for storing the data in the queue, and old data is removed. In addition, in Step 225, RTP data, if available, is received along with simulated energy usage data for the HVAC unit for the current day. Then, in Step 227, the RTP data is used to adjust the DR strategy during the day it is applied. Steps 215 through 227 are then repeated each day. The energy costs and/or usage associated with each DR strategy are displayed by the pricing module (not shown), which allows a user to compare DR strategies and which yield lower energy costs and usage.

FIGS. 8A and 8B illustrate an exemplary process for generating one or more DR strategies for the HVAC unit, but the process and data described above may be adapted for other types of energy consuming units.

The exemplary pseudo code in Alg. 1 above may be adapted for use with the simulated energy consumption data from the simulation module to model energy consumption and generate a DR policy for the next day. Lines 1 to 8 correspond to Steps 201 through 213 of FIG. 8A for establishing an initial DR strategy until sufficient amounts of actual data are available. Lines 9 and 10 correspond to Steps 215 through 227 of FIG. 8B for establishing a more accurate DR strategy once sufficient data is stored.

FIG. 10 compares HVAC energy consumption models created using the simplified approach, the neural network approach, and the regression approach with the energy consumption simulated by the simulation module of system 60, which is indicated as "eQuest" in FIG. 10. For the neural network and regression approaches, the model is obtained based on the data saved in the queues, updated each time when new data is added into the queues, and then used for the energy consumption estimation for the next day. For example, if the model is updated on Tuesday, it will be used for energy consumption estimation on Wednesday. As shown in FIG. 10, results generated by using the simplified model are quite different from actual simulated energy consumption. However, for neural network and regression approaches, the estimation becomes more reliable and accurate as more data are collected and used to learn the model. FIG. 10(*a*) illustrates the modeled energy consumption using two days of data, 10(*b*) illustrates modeled energy consumption using four days of data, and 10(*c*) illustrates modeled energy consumption using six days of data. As shown in these three graphs, the difference between the models learned by using the neural network and regression approaches is small, and the estimation by the neural network and regression approaches becomes closer to the actual simulated energy consumption as data from more days are stored in the queues.

Figure 11:
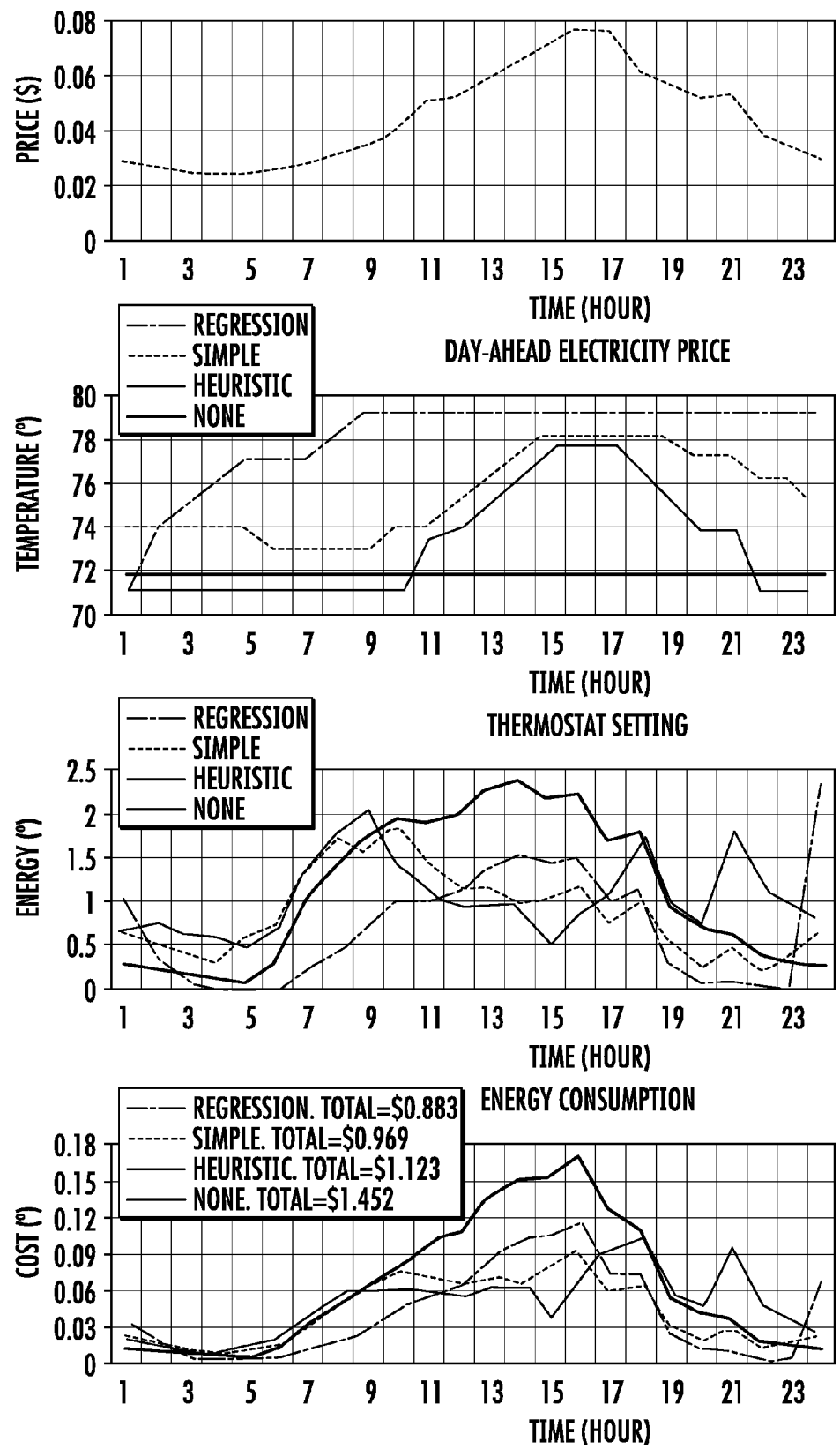
Figure 12:
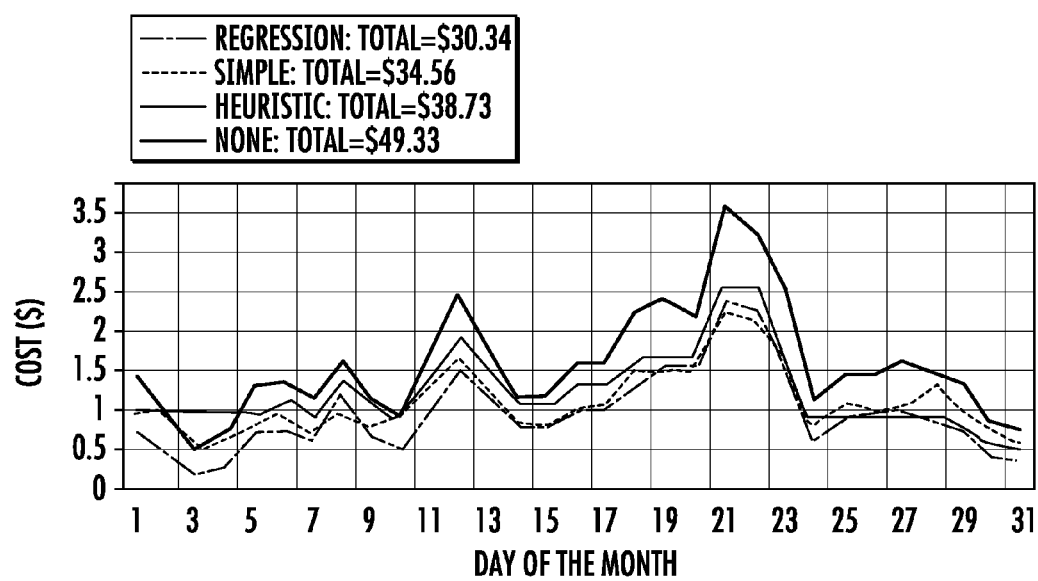

To better understand the performance, a comparison study is made as shown by FIGS. 11 and 12 through the computational experiment system 60, in which "None" represents a constant thermostat setting at 72°, "Heuristic" stands for the thermostat setting by using heuristic DR strategy, "Simple" signifies the optimal thermostat setting based on the simplified model (see Equation 5), and "Regression" represents the optimal thermostat setting by using a substantially real-time adaptive regression model (See Equation 8). For the heuristic algorithm, a "nine-point" thermostat setting at 71°; 72°, 73°, 74°, 75°, 76°, 77°, 78° and 79° is used, in which 71° and 79° are the thermostat settings corresponding to $PR^{min}$ and $PR^{max}$ during a day, respectively. For the optimal DR strategy algorithms, the upper and lower temperature settings are 71° and 79°, respectively. Table 1 below shows a comparison of the HVAC cost for five consecutive days, in which the regression-based approach updates the HVAC energy consumption model daily when new energy consumption data is available. FIG. 12 shows a comparison of the HVAC cost for one month by using different energy consumption models based on DAP tariff. As can be seen from FIGS. 11 and 12 and Table 1, as well as other results, the learning-based DR strategies are the most efficient among all the DR strategies, demonstrating the effectiveness and excellent performance of the learning based DR strategy systems.

TABLE 1

HVAC energy cost for five consecutive days based on DAP

|  | Day 1 | Day 2 | Day 3 | Day 4 | Day 5 |
|---|---|---|---|---|---|
| None | $1.571 | $1.503 | $1.181 | $0.867 | $1.571 |
| Heuristic Approach | $1.124 | $1.028 | $0.850 | $0.687 | $1.020 |
| Simple Optimization Approach | $1.019 | $0.997 | $0.795 | $0.642 | $0.983 |
| Regression Based Approach | $1.015 | $0.988 | $0.789 | $0.595 | $0.902 |

Table 2 below shows a comparison of the HVAC cost for a high, mild, and low cost day for RTP and DAP tariffs. PSO and regression-based approaches are listed separately.

TABLE 2

HVAC energy cost for five continuous days

|  | Highest | | Mild | | Low | |
|---|---|---|---|---|---|---|
|  | RTP | DAP | RTP | DAP | RTP | DAP |
| None | $5.09 | $3.44 | $1.60 | $1.57 | $1.36 | $1.32 |
| Heuristic Approach | $3.77 | $2.28 | $1.08 | $1.38 | $1.04 | $0.88 |
| Optimization Approach based on Eq. (5) | $3.12 | $2.05 | $0.93 | $0.80 | $0.90 | $0.82 |
| Optimization Approach based on Eq. (8) | $3.12 | $1.98 | $0.73 | $0.76 | $0.73 | $0.66 |
| PSO Approach based on Eq. (8) | $3.11 | $1.94 | $0.77 | $0.56 | $0.88 | $0.76 |

Figure 13:
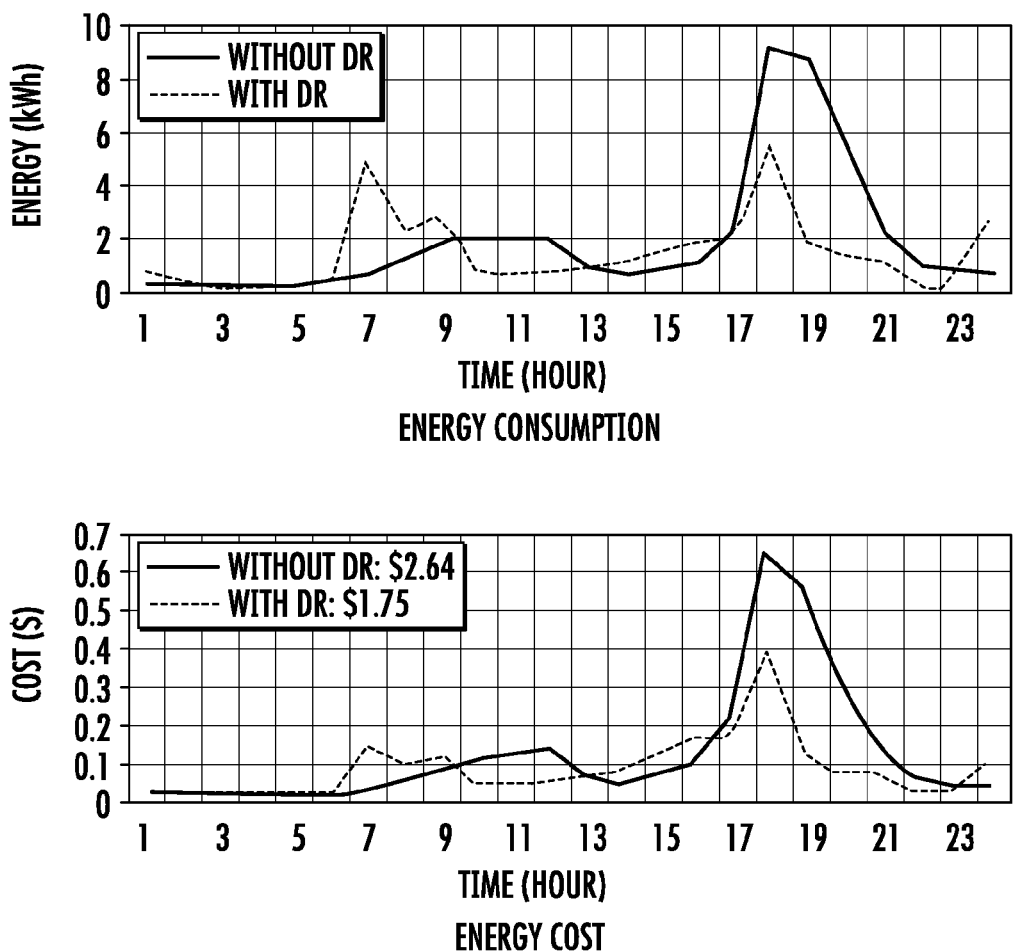

FIG. 13 compares total energy and energy cost for the house with and without demand response during a high DAP day on a Friday in July. As shown in FIG. 13, with demand response, peak load is clearly reduced and the energy usage of dryers and dishwasher is shifted to low cost time period of the day.

Figure 14:
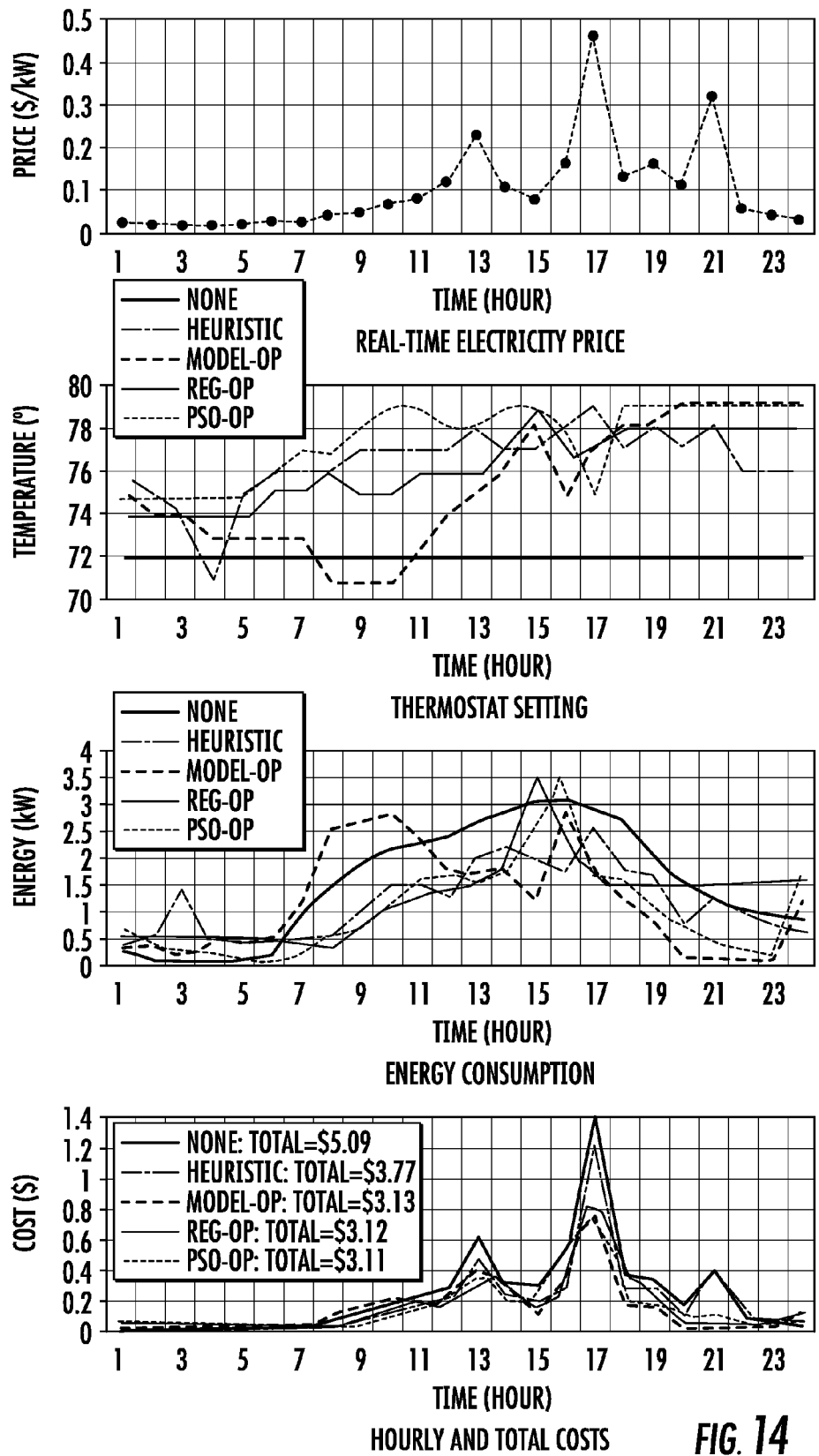
Figure 15:
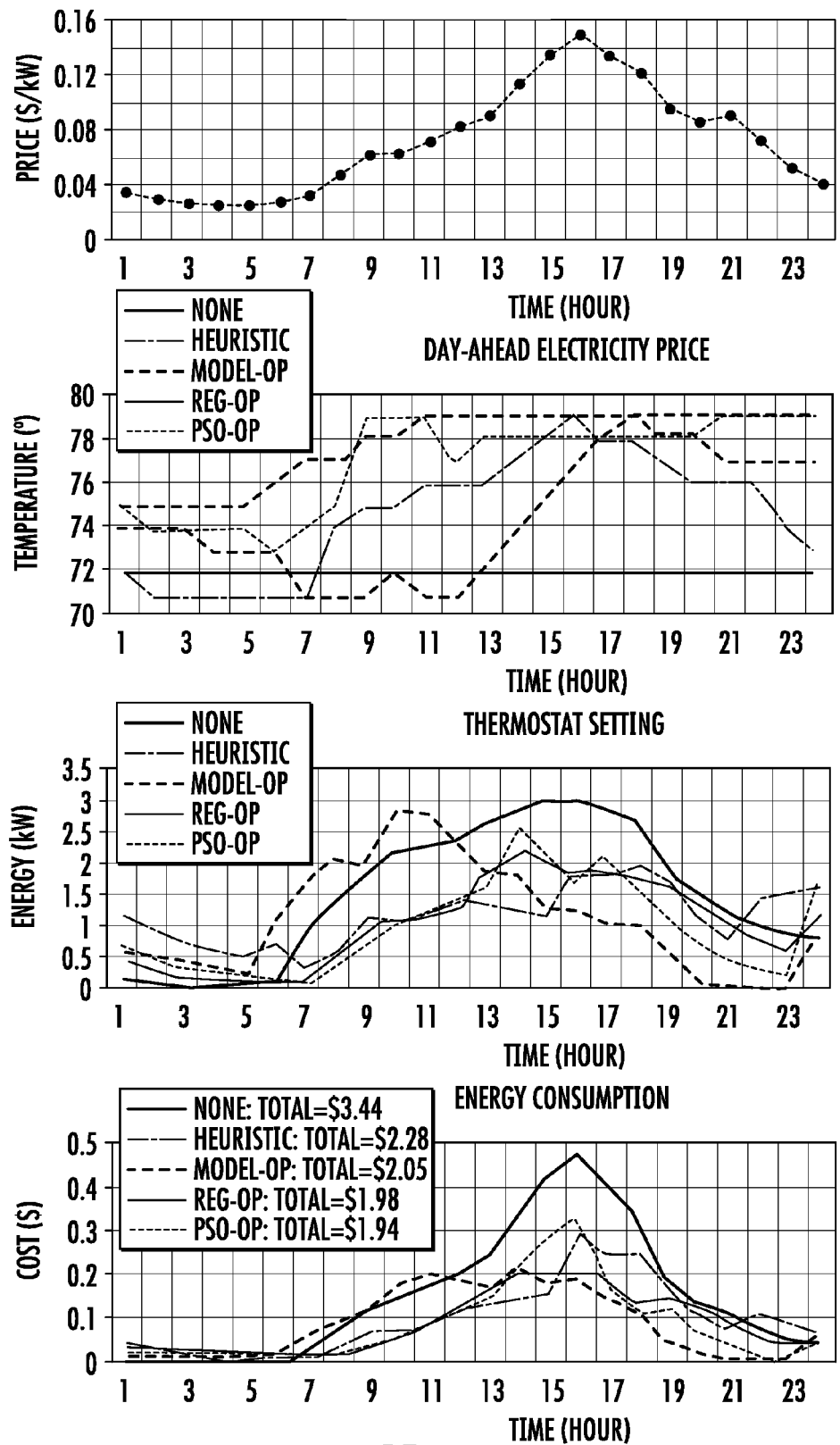

Compared to conventional simplified models, the learning-based approaches to modeling home energy consumption can accurately capture the energy consumption of a house under complicated weather conditions. In particular, FIGS. 14 and 15 illustrate a comparison of the HVAC energy consumption and cost using the following DR strategy approaches: none, a heuristic approach ("Heuristic"), a simplified optimal approach ("Model-OP") based on Equation 5, an optimal approach based on regressed energy consumption model ("Reg-OP"), and a PSO optimization approach based on regressed energy consumption model ("PSO-OP"). FIG. 14 illustrates the comparison using RTP tariff for the highest RTP tariff day in the summer, and FIG. 15 illustrates the comparison using the DAP tariff for the highest DAP tariff in the summer. The comparisons in FIGS. 14 and 15 show that the difference in cost saving between the DR strategies solved by using normal nonlinear programming technique ("Reg-OP") and the PSO method ("PSO-OP") is small.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. An energy consumption management system comprising:
   one or more local receivers disposed adjacent a respective one of one or more energy consuming units in a building, each local receiver comprising a processor configured for receiving usage instructions for the adjacent energy consuming unit and causing the usage instructions to be executed for the energy consuming unit; and
   a central computing system comprising:
      a memory configured for storing actual usage data associated with at least one energy consuming unit in the building for one or more time windows on each of days i through j, wherein day i is the first day for which data is stored and day j is the most recent day for which data is stored; and
      a processor configured for:
         receiving the actual usage data from the memory;
         executing at least one computer-based learning system to model energy consumption for day j+1 based on at least the actual energy usage data for the energy consumption unit;
         generating a demand response strategy for the energy consuming unit for day j+1 based on the modeled energy consumption and next-day energy pricing for each time window for day j+1; and
         communicating the demand response strategy of the energy consuming unit to the local receiver associated with the energy consuming unit, the demand response strategy comprising the usage instructions, wherein at least one of the one or more energy consuming units comprise an HVAC system and the computer-based learning system associated with the HVAC system comprises a regression based system, wherein the regression based system solves the following non-linear equation to learn energy consumption of the HVAC system:

$$Q_k = q(T_{k+1}^I, T_k^I, T_k^O, \beta),$$

wherein $Q_k$ is the $k^{th}$ HVAC energy consumption observation stored in the memory, $q(\bullet)$ is a third order polynomial function of a predictor variable vector $(T_{k+1}^I, T_k^I, T_k^O)$ which includes thermostat settings, indoor temperatures, and outdoor temperatures for observations $k=1 \ldots n$, respectively, n is the number of observations saved in the memory, and $\beta$ is a parameter vector that includes $\beta_0, \beta_1, \ldots, \beta_p$.

2. The system of claim 1, wherein the processor is configured for executing a second computer-based learning system comprising a neural network system.

3. The system of claim 1, wherein causing the usage instructions to be executed for the energy consuming unit comprises communicating the usage instructions to the energy consuming unit.

4. The system of claim 1, wherein causing the usage instructions to be executed for the energy consuming unit comprises controlling the energy consuming unit according to the usage instructions.

5. The system of claim 1, wherein the demand response strategy comprises scheduled usage for the energy consuming unit during each time window of day j+1.

6. The system of claim 1, wherein the demand response strategy for the HVAC system comprises thermostat settings for the HVAC system for each time window of day j+1.

7. A system for creating a demand response strategy for a building, the system comprising a computing device comprising:
   a memory configured for storing actual usage data associated with an HVAC system in the building for one or more time windows on each of days i through j, wherein day i is the first day for which data is stored and j is the most recent day for which data is stored, wherein the actual usage data comprises an outdoor temperature for each time window on days i through j, an indoor temperature for each time window on days i through j, and a thermostat setting for each time window on days i through j; and
   a processor configured for:
      receiving the actual usage data from the memory;
      executing at least one regression-based learning system to model energy consumption of the HVAC system for day j+1 based on at least a weather forecast for day j+1 and the actual usage data for the HVAC system, and
      generating a demand response strategy for the HVAC system for day j+1 based on the modeled energy consumption and next-day energy pricing for each time window for day j+1, wherein generating the demand response strategy comprises generating at least thermostat settings for one or more time windows on day j+1 such that energy costs for day j+1 are minimized, and wherein the regression-based learning system solves the following non-linear equation to learn energy consumption of the HVAC system:

$$Q_k = q(T_{k+1}^I, T_k^I, T_k^O, \beta),$$

wherein $Q_k$ is the $k^{th}$ HVAC energy consumption observation stored in the memory, $q(\bullet)$ is a third order polynomial function of a predictor variable vector $(T_{k+1}^I, T_k^I, T_k^O)$ which includes thermostat settings, indoor temperatures, and outdoor temperatures for observations $k=1 \ldots n$, respectively, n is the number of observations saved in the memory, and $\beta$ is a parameter vector that includes $(\beta_0, \beta_1, \ldots, \beta_p)$.

8. The system of claim 7, wherein:
   the processor is further configured for:
      receiving usage data associated with operating a deferrable load energy consuming unit for each run cycle,
      receiving next-day energy pricing for each time window for day j+1, and
      generating a demand response strategy for the deferrable load energy consuming unit, the demand response strategy for the deferrable load energy consuming unit comprising at least one time window in day j+1 during which operation of the deferrable load energy consuming unit is allowed based at least on the usage data associated with the deferrable load energy consuming unit and the next-day energy pricing for day j+1.

9. The system of claim 8, wherein the processor is further configured for electrically communicating the demand response strategy for day j+1 associated with the HVAC system to a first control receiver and the demand response strategy for day j+1 associated with the deferrable load energy consuming unit to a second control receiver, the first control receiver being associated with and in electrical communication with the HVAC system and the second control receiver being associated with and in electrical communication with the deferrable load energy consuming unit, the first and second control receivers configured for controlling operation of the HVAC system and the deferrable load energy consuming unit, respectively, based on the communicated demand response strategies.

10. The system of claim 8, wherein generating the demand response strategy for the deferrable load energy consuming unit comprises executing a binary integer programming strategy.

11. The system of claim 7, wherein:
the memory is configured for storing a current charge for a battery on day j, the battery configured for receiving and storing energy generated by a photovoltaic system; and
the processor is further configured for:
receiving the current charge for the battery from the memory, and
generating a control and management strategy for the battery for day j+1 based at least on the current charge and next-day energy generation and consumption difference between at least one renewable energy source and at least one energy consuming unit, wherein the control strategy for the battery comprises identifying one or more time windows during which the battery is charged when PV generation is higher than the demand or energy from the battery is discharged for consumption by one or more energy consuming units when PV generation is below a predetermined level.

* * * * *